United States Patent
Amimoto et al.

(10) Patent No.: US 11,582,528 B2
(45) Date of Patent: *Feb. 14, 2023

(54) DATA PROCESSING APPARATUS AND DATA PROCESSING METHOD

(71) Applicant: SATURN LICENSING LLC, New York, NY (US)

(72) Inventors: Tatsuki Amimoto, Tokyo (JP); Lachlan Bruce Michael, Saitama (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/644,250

(22) Filed: Dec. 14, 2021

(65) Prior Publication Data

US 2022/0217448 A1 Jul. 7, 2022

Related U.S. Application Data

(63) Continuation of application No. 15/773,809, filed as application No. PCT/JP2017/000924 on Jan. 13, 2017, now Pat. No. 11,223,881.

(30) Foreign Application Priority Data

Jan. 27, 2016 (JP) .................. 2016-013567

(51) Int. Cl.
*G06F 15/16* (2006.01)
*H04N 21/61* (2011.01)
(Continued)

(52) U.S. Cl.
CPC ......... *H04N 21/6112* (2013.01); *H04H 20/95* (2013.01); *H04J 3/00* (2013.01);
(Continued)

(58) Field of Classification Search
CPC .... H04H 21/6112; H04J 3/00; H04N 21/2343
(Continued)

(56) References Cited

U.S. PATENT DOCUMENTS 7,295,763 B1 11/2007 Cooper et al.
2010/0135422 A1* 6/2010 Lee ...................... H04L 5/0053
375/260

(Continued)

FOREIGN PATENT DOCUMENTS

JP 2006-270824 A 10/2006
JP 2009-302642 A 12/2009
(Continued)

OTHER PUBLICATIONS

Digital Video Broadcasting (DVB); Frame Structure Channel Coding and Modulation for a Second Generation Digital Terrestrial Television Broadcasting System (DVB-T2); DVB Document A122, Nov. 1, 2014, pp. 1-189, XP055486024. Retrieved from the Internet: URL :https://www.dvb.org/resources/public/standards/al 22_dvb-t2_spec. [retrieved on Jun. 20, 2018].

(Continued)

*Primary Examiner* — Duyen M Doan
(74) *Attorney, Agent, or Firm* — Chris Kolefas

(57) ABSTRACT

The present technique relates to a data processing apparatus and a data processing method each of which enables a burden imposed on processing on a reception side to be reduced.
A data processing apparatus produces signaling containing a Null cell number exhibiting the number of Null cells of cells of a sub-frame included in a physical layer frame, and processes the signaling so as for the signaling to be contained in a preamble of the physical layer frame, thereby enabling a burden imposed on processing on a reception side to be reduced. The present technique, for example, can be (Continued)

applied to data transmission complying with the broadcasting standards such as ATSC3.0.

17 Claims, 26 Drawing Sheets

(51) Int. Cl.
| | | |
|---|---|---|
| *H04J 3/00* | (2006.01) | |
| *H04N 21/2383* | (2011.01) | |
| *H04H 20/95* | (2008.01) | |
| *H04N 21/2343* | (2011.01) | |
| *H04N 21/236* | (2011.01) | |
| *H04N 21/434* | (2011.01) | |

(52) U.S. Cl.
CPC ....... *H04N 21/236* (2013.01); *H04N 21/2343* (2013.01); *H04N 21/2383* (2013.01); *H04N 21/434* (2013.01); *H04N 21/61* (2013.01); *H04N 21/6162* (2013.01)

(58) Field of Classification Search
USPC .................................................. 709/203, 246
See application file for complete search history.

(56) References Cited

U.S. PATENT DOCUMENTS

| | | |
|---|---|---|
| 2011/0164671 A1 | 7/2011 | Matsumura |
| 2012/0307842 A1 | 12/2012 | Petrov et al. |
| 2012/0314762 A1 | 12/2012 | Herrmann et al. |
| 2013/0114764 A1 | 5/2013 | Zhang et al. |
| 2015/0023249 A1 | 1/2015 | Hwang et al. |
| 2015/0063357 A1 | 3/2015 | Hwang et al. |
| 2015/0180799 A1 | 6/2015 | Lovett et al. |
| 2015/0270940 A1 | 9/2015 | Mourad et al. |
| 2016/0197826 A1* | 7/2016 | Yang .................... H04L 65/612 370/392 |
| 2016/0205017 A1* | 7/2016 | Hwang .................. H04L 69/04 370/392 |
| 2016/0218824 A1 | 7/2016 | Kim et al. |
| 2017/0126558 A1* | 5/2017 | Kwon .................... H04L 45/74 |
| 2021/0314061 A1* | 10/2021 | Breynaert ............... H04B 1/69 |

FOREIGN PATENT DOCUMENTS

| | | |
|---|---|---|
| JP | 2012-100178 A | 5/2012 |
| JP | 2014-82675 A | 5/2014 |
| JP | 2015-92692 A | 5/2015 |
| JP | 2015-133723 A | 7/2015 |
| JP | 2015-522969 A | 8/2015 |

OTHER PUBLICATIONS

ATSC Advanced Television Systems Committee; "ATSC Candidate Standard: Physical Layer Protocol"; Doc. S32-230r21; Sep. 28, 2015; 228 Pages.

International Search Report dated Feb. 14, 2017 in PCT/JP2017/000924 filed Jan. 13, 2017.

Extended European Search Report dated Sep. 27, 2018 in corresponding European Patent Application No. 17743955.1, 7 pages.

"ATSC Standard: Physical Layer Protocol (A/322)", Doc. A/322:2016, Advanced Television Systems Committee, XP55405794, Sep. 7, 2016, pp. 1-258.

* cited by examiner

FIG. 2

L1-Basic signaling fields and syntax

| Syntax | # of bits | format |
|---|---|---|
| L1_Basic_signaling() { | | |
|     L1B_content_tag | 2 | uimsbf |
|     L1B_version | 3 | uimsbf |
|     L1B_slt_flag | 1 | uimsbf |
|     L1B_time_info_flag | 1 | uimsbf |
| | | |
|     L1B_papr | 2 | uimsbf |
|     L1B_frame_length_mode | 1 | uimsbf |
|     L1B_frame_length | 10 | uimsbf |
|     L1B_num_subframes | 8 | uimsbf |
| | | |
|     L1B_preamble_num_symbols | 3 | uimsbf |
|     L1B_preamble_reduced_carriers | 3 | uimsbf |
|     L1B_L1_Detail_size_bits | 16 | uimsbf |
|     L1B_L1_Detail_fec_type | 3 | uimsbf |
|     L1B_L1_Detail_additional_parity_mode | 2 | uimsbf |
|     L1B_L1_Detail_total_cells | 19 | uimsbf |
| | | |
|     L1B_First_Sub_mimo | 1 | uimsbf |
|     L1B_First_Sub_miso | 1 | uimsbf |
|     L1B_First_Sub_fft_size | 2 | uimsbf |
|     L1B_First_Sub_reduced_carriers | 3 | uimsbf |
|     L1B_First_Sub_guard_interval | 4 | uimsbf |
|     L1B_First_Sub_excess_samples | 13 | uimsbf |
|     L1B_First_Sub_num_ofdm_symbols | 11 | uimsbf |
|     L1B_First_Sub_scattered_pilot_pattern | 5 | uimsbf |
|     L1B_First_Sub_scattered_pilot_boost | 3 | uimsbf |
|     L1B_First_Sub_sbs_first | 1 | uimsbf |
|     L1B_First_Sub_sbs_last | 1 | uimsbf |
|     L1B_Reserved | TBD | uimsbf |
|     L1B_crc | 32 | uimsbf |
| } | | |

FIG.3

L1-Detail signaling fields and syntax

| Syntax | # of bits | format |
|---|---|---|
| L1_Detail_signaling() { | | |
|    L1D_version | 4 | uimsbf |
|    L1D_num_rf | 3 | uimsbf |
|    for L1D_rf_id=1 .. L1D_num_rf{ | | |
|       L1D_rf_frequency | 19 | uimsbf |
|    } | | |
|    if(L1B_time_info_flag=1) { | | |
|       L1D_time_info | TBD | |
|    } | | |
|    for i=0 .. L1B_num_subframes{ | | |
|       if(i>0) { | | |
|          L1D_mimo | 1 | uimsbf |
|          L1D_miso | 1 | uimsbf |
|          L1D_fft_size | 2 | uimsbf |
|          L1D_reduced_carriers | 3 | uimsbf |
|          L1D_guard_interval | 4 | uimsbf |
|          L1D_num_ofdm_symbols | 11 | uimsbf |
|          L1D_scattered_pilot_pattern | 5 | uimsbf |
|          L1D_scattered_pilot_boost | 3 | uimsbf |
|          L1D_sbs_first | 1 | uimsbf |
|          L1D_sbs_last | 1 | uimsbf |
|       } | | |
|       if(L1B_num_subframes>0) { | | |
|          L1D_subframe_multiplex | 1 | uimsbf |
|       } | | |
|       L1D_frequency_interleaver | 1 | uimsbf |

| Syntax | # of bits | format |
|---|---|---|
| L1D_num_plp | 6 | uimsbf |
|  |  |  |
| for j=0..L1D_num_plp{ |  |  |
|     L1D_plp_id | 6 | uimsbf |
|     L1D_plp_slt_exist | 1 | uimsbf |
|     L1D_plp_layer | 2 | uimsbf |
|     L1D_plp_start | 24 | uimsbf |
|     L1D_plp_size | 24 | uimsbf |
|     L1D_plp_scrambler_type | 2 | uimsbf |
|     L1D_plp_fec_type | 4 | uimsbf |
|     if(L1D_plp_fec_type∈{0,1,2,3,4,5}){ |  |  |
|         L1D_plp_mod | 4 | uimsbf |
|         L1D_plp_cod | 4 | uimsbf |
|     } |  |  |
|     L1D_plp_TI_mode | 2 | uimsbf |
|  |  |  |
|     if(L1D_plp_TI_mode=01){ |  |  |
|         L1D_CTI_fecframe_start | 21 | uimsbf |
|     } |  |  |
|  |  |  |
|     if(L1D_num_rf>0){ |  |  |
|         L1D_plp_num_channel_bonded | 3 | uimsbf |
|         if(L1D_plp_num_channel_bonded>0){ |  |  |
|             L1D_plp_channel_bonding_format | 2 | uimsbf |
|             for k=0..L1D_plp_num_channel_bonded{ |  |  |
|                 L1D_plp_bonded_rf_id | 3 | uimsbf |
|             } |  |  |
|         } |  |  |
|     } |  |  |
|  |  |  |
|     if(i=0 && L1B_First_Sub_mimo=1)||(i>1 && L1D_mimo=1){ |  |  |
|         L1D_plp_stream_combining | 1 | uimsbf |
|         L1D_plp_IQ_interleaving | 1 | uimsbf |
|         L1D_plp_PH | 1 | uimsbf |
|     } |  |  |
|  |  |  |
|     if(L1D_plp_layer=0){ |  |  |
|  |  |  |
|         L1D_plp_type | 1 | uimsbf |
|         if L1D_plp_type=1{ |  |  |
|             L1D_num_subslices | 14 | uimsbf |
|             L1D_subslice_interval | 24 | uimsbf |
|         } |  |  |
|  |  |  |
|         L1D_plp_TI_extended_interleaving | 1 | uimsbf |

| Syntax | # of bits | format |
|---|---|---|
| L1D_CTI_depth | 3 | uimsbf |
| if(L1D_plp_TI_mode=01) { | | |
| | | |
| L1D_CTI_start_row | 10 | uimsbf |
| } | | |
| else{ | | |
| L1D_HTI_inter_subframe | 1 | uimsbf |
| L1D_HTI_num_ti_blocks | 4 | uimsbf |
| L1D_HTI_num_fec_blocks_max | 12 | uimsbf |
| for k=0..L1D_HTI_num_ti_blocks{ | | |
| L1D_HTI_num_fec_blocks | 12 | uimsbf |
| } | | |
| L1D_HTI_cell_interleaver | 1 | uimsbf |
| } | | |
| } | | |
| else{ | | |
| L1D_ldm_injection_level | 4 | uimsbf |
| } | | |
| | | |
| } | | |
| } | | |
| | | |
| L1D_Reserved | TBD | uimsbf |
| L1D_crc | 32 | uimsbf |
| } | | |

FIG. 7

Total number of data cells in a subframe boundary symbol

| FFT Size | $C_{red\_coeff}$ | NoC | SP3_2 | SP3_4 | SP4_2 | SP4_4 | SP6_2 | SP6_4 | SP8_2 | SP8_4 |
|---|---|---|---|---|---|---|---|---|---|---|
| 8K | 0 | 6913 | 4560 | 4560 | 5136 | 5136 | 5712 | 5712 | 6000 | 6000 |
|  | 1 | 6817 | 4496 | 4496 | 5064 | 5064 | 5632 | 5632 | 5916 | 5916 |
|  | 2 | 6721 | 4433 | 4433 | 4993 | 4993 | 5553 | 5553 | 5833 | 5833 |
|  | 3 | 6625 | 4370 | 4370 | 4922 | 4922 | 5474 | 5474 | 5750 | 5750 |
|  | 4 | 6529 | 4307 | 4307 | 4851 | 4851 | 5395 | 5395 | 5667 | 5667 |
| 16K | 0 | 13825 | 9120 | 9120 | 10272 | 10272 | 11424 | 11424 | 12000 | 12000 |
|  | 1 | 13633 | 8992 | 8992 | 10128 | 10128 | 11264 | 11264 | 11832 | 11832 |
|  | 2 | 13441 | 8867 | 8867 | 9987 | 9987 | 11107 | 11107 | 11667 | 11667 |
|  | 3 | 13249 | 8740 | 8740 | 9844 | 9844 | 10948 | 10948 | 11500 | 11500 |
|  | 4 | 13057 | 8614 | 8614 | 9702 | 9702 | 10790 | 10790 | 11334 | 11334 |
| 32K | 0 | 27649 | 18240 | (18240) | N/A | N/A | 22848 | (22848) | 24000 | (24000) |
|  | 1 | 27265 | 17984 | (17984) | N/A | N/A | 22528 | (22528) | 23664 | (23664) |
|  | 2 | 26881 | 17734 | (17734) | N/A | N/A | 22214 | (22214) | 23334 | (23334) |
|  | 3 | 26497 | 17480 | (17480) | N/A | N/A | 21896 | (21896) | 23000 | (23000) |
|  | 4 | 26113 | 17228 | (17228) | N/A | N/A | 21580 | (21580) | 22668 | (22668) |

FIG. 8

| FFT Size | $C_{red\_coeff}$ | NoC | Total number of data cells in a subframe boundary symbol | | | | | | | Total data cells in a subframe boundary symbol | | |
|---|---|---|---|---|---|---|---|---|---|---|---|---|
| | | | SP12_2 | SP12_4 | SP16_2 | SP16_4 | SP24_2 | SP24_4 | SP32_2 | SP32_4 | | |
| 8K | 0 | 6913 | 6288 | 6288 | 6432 | 6432 | 6576 | 6576 | 6648 | 6648 | | |
| | 1 | 6817 | 6200 | 6200 | 6342 | 6342 | 6484 | 6484 | 6555 | 6555 | | |
| | 2 | 6721 | 6113 | 6113 | 6253 | 6253 | 6393 | 6393 | 6463 | 6463 | | |
| | 3 | 6625 | 6026 | 6026 | 6164 | 6164 | 6302 | 6302 | 6371 | 6371 | | |
| | 4 | 6529 | 5939 | 5939 | 6075 | 6075 | 6211 | 6211 | 6279 | 6279 | | |
| 16K | 0 | 13825 | 12576 | 12576 | 12864 | 12864 | 13152 | 13152 | 13296 | 13296 | | |
| | 1 | 13633 | 12400 | 12400 | 12684 | 12684 | 12968 | 12968 | 13110 | 13110 | | |
| | 2 | 13441 | 12227 | 12227 | 12507 | 12507 | 12787 | 12787 | 12927 | 12927 | | |
| | 3 | 13249 | 12052 | 12052 | 12328 | 12328 | 12604 | 12604 | 12742 | 12742 | | |
| | 4 | 13057 | 11878 | 11878 | 12150 | 12150 | 12422 | 12422 | 12558 | 12558 (A) | | |
| 32K | 0 | 27649 | 25152 | (25152) | 25728 | (25728) | 26304 | (26304) | 26592 | (26592) | | |
| | 1 | 27265 | 24800 | (24800) | 25368 | (25368) | 25936 | (25936) | 26220 | (26220) | | |
| | 2 | 26881 | 24454 | (24454) | 25014 | (25014) | 25574 | (25574) | 25854 | (25854) | | |
| | 3 | 26497 | 24104 | (24104) | 24656 | (24656) | 25208 | (25208) | 25484 | (25484) | | |
| | 4 | 26113 | 23756 | (23756) | 24300 | (24300) | 24844 | (24844) | 25116 | (25116) | | |

FIG. 9

The number of active data cells in a subframe boundary symbol when $C_{red\_coeff}=0$

| FFT Size | L1_scatte red_pilot_boost | NoC | Active data cells in a subframe boundary symbol |||||||
|---|---|---|---|---|---|---|---|---|---|
| | | | SP3_2 | SP3_4 | SP4_2 | SP4_4 | SP6_2 | SP6_4 | SP8_2 | SP8_4 |
| 8K | 0 | 6913 | 4560 | 4560 | 5136 | 5136 | 5712 | 5712 | 6000 | 6000 |
| | 1 | 6817 | 4560 | 3904 | 5009 | 4332 | 5456 | 4856 | 5716 | 5168 |
| | 2 | 6721 | 4123 | 2922 | 4600 | 3467 | 5114 | 4147 | 5398 | 4558 |
| | 3 | 6625 | 3801 | 2148 | 4278 | 2868 | 4843 | 3588 | 5188 | 4078 |
| | 4 | 6529 | 3467 | 1534 | 4022 | 2245 | 4629 | 3146 | 4971 | 3697 |
| 16K | 0 | 13825 | 9120 | 9120 | 10272 | 10272 | 11424 | 11424 | 12000 | 12000 |
| | 1 | 13633 | 9120 | 7807 | 10017 | 8663 | 10912 | 9708 | 11431 | 10331 |
| | 2 | 13441 | 8244 | 5841 | 9199 | 6930 | 10225 | 8288 | 10793 | 9109 |
| | 3 | 13249 | 7601 | 4290 | 8554 | 5731 | 9684 | 7168 | 10375 | 9146 |
| | 4 | 13057 | 6933 | 3063 | 8043 | 4484 | 9256 | 6282 | 9939 | 7383 |
| 32K | 0 | 27649 | 18240 | (18240) | N/A | N/A | 22848 | (22848) | 24000 | (24000) |
| | 1 | 27265 | 18240 | (15612) | N/A | N/A | 21823 | (19412) | 22861 | (20658) |
| | 2 | 26881 | 16488 | (11678) | N/A | N/A | 20449 | (16570) | 21585 | (18212) |
| | 3 | 26497 | 15202 | (8576) | N/A | N/A | 19367 | (14329) | 20747 | (16283) |
| | 4 | 26113 | 13865 | (6121) | N/A | N/A | 1851 | (12555) | 19876 | (14755) |

FIG. 10

The number of active data cells in a subframe boundary symbol when $C_{red\_coeff}=0$

| FFT Size | L1_scatte red_pilot_boost | Active data cells in a subframe boundary symbol |||||||||
|---|---|---|---|---|---|---|---|---|---|---|
| | | NoC | SP12_2 | SP12_4 | SP16_2 | SP16_4 | SP24_2 | SP24_4 | SP32_2 | SP32_4 |
| 8K | 0 | 6913 | 6288 | 6288 | 6432 | 6432 | 6576 | 6576 | 6548 | 6548 |
| | 1 | 6817 | 5976 | 5508 | 6132 | 5691 | 6297 | 5922 | 6384 | 6064 |
| | 2 | 6721 | 5729 | 5010 | 5919 | 5252 | 6123 | 5564 | 6231 | 5757 |
| | 3 | 6625 | 5533 | 4616 | 5751 | 4906 | 5986 | 5282 | 6125 | 5515 |
| | 4 | 6529 | 5379 | 4305 | 5618 | 4633 | 5877 | 5058 | 6015 | 5324 |
| 16K | 0 | 13825 | 12576 | 12576 | 12864 | 12864 | 13152 | 13152 | 13296 | 13296 |
| | 1 | 13633 | 11950 | 11011 | 12262 | 11374 | 12593 | 11834 | 12766 | 12116 |
| | 2 | 13441 | 11455 | 10010 | 11835 | 10493 | 12243 | 11113 | 12458 | 11497 |
| | 3 | 13249 | 11064 | 9221 | 11499 | 9798 | 11968 | 10544 | 12245 | 11008 |
| | 4 | 13057 | 10755 | 8596 | 11233 | 9248 | 11750 | 10094 | 12024 | 10622 |
| 32K | 0 | 27649 | 25152 | (25152) | 25728 | (25728) | 26304 | (26304) | 26592 | (26592) |
| | 1 | 27265 | 23899 | (22016) | 24521 | (22740) | 25183 | (23658) | 25529 | (24221) |
| | 2 | 26881 | 22907 | (20010) | 23667 | (20974) | 24483 | (22211) | 24913 | (22976) |
| | 3 | 26497 | 22124 | (18429) | 22994 | (19581) | 23931 | (21070) | 24486 | (21995) |
| | 4 | 26113 | 21505 | (17177) | 22461 | (18479) | 23494 | (20167) | 24042 | (21218) |

The number of active data cells in a subframe boundary symbol when $C_{red\_coeff}=4$

| FFT Size | L1_scatte red_pilot_boost | NoC | Active data cells in a subframe boundary symbol | | | | | | | |
|---|---|---|---|---|---|---|---|---|---|---|
| | | | SP12_2 | SP12_4 | SP16_2 | SP16_4 | SP24_2 | SP24_4 | SP32_2 | SP32_4 |
| 8K | 0 | 6913 | 5939 | 5939 | 6075 | 6075 | 6211 | 6211 | 6279 | 6279 |
| | 1 | 6817 | 5644 | 5203 | 5792 | 5375 | 5948 | 5594 | 6030 | 5728 |
| | 2 | 6721 | 5411 | 4732 | 5591 | 4961 | 5784 | 5256 | 5886 | 5438 |
| | 3 | 6625 | 5227 | 4361 | 5432 | 4635 | 5654 | 4990 | 5786 | 5210 |
| | 4 | 6529 | 5081 | 4067 | 5307 | 4377 | 5552 | 4779 | 5682 | 5030 |
| 16K | 0 | 13825 | 11878 | 11878 | 12150 | 12150 | 12422 | 12422 | 12558 | 12558 |
| | 1 | 13633 | 11287 | 10400 | 11581 | 10743 | 11894 | 11178 | 12058 | 11444 |
| | 2 | 13441 | 10819 | 9455 | 11178 | 9911 | 11564 | 10497 | 11767 | 10860 |
| | 3 | 13249 | 10450 | 8710 | 10861 | 9255 | 11304 | 9960 | 11566 | 10399 |
| | 4 | 13057 | 10158 | 8120 | 10609 | 8736 | 11098 | 9536 | 11357 | 10034 |
| 32K | 0 | 27649 | 23756 | (23756) | 24300 | (24300) | 24844 | (24844) | 25116 | (25116) |
| | 1 | 27265 | 22572 | (20794) | 23160 | (21478) | 23785 | (22345) | 24112 | (22877) |
| | 2 | 21636 | (18900) | 22354 | (19810) | 23124 | (20979) | 23530 | (21702) | 21636 |
| | 3 | 20897 | (17407) | 21718 | (18495) | 22603 | (19902) | 23127 | (20775) | 20897 |
| | 4 | 20312 | (16225) | 21215 | (17454) | 22190 | (19049) | 22708 | (20042) | 20312 |

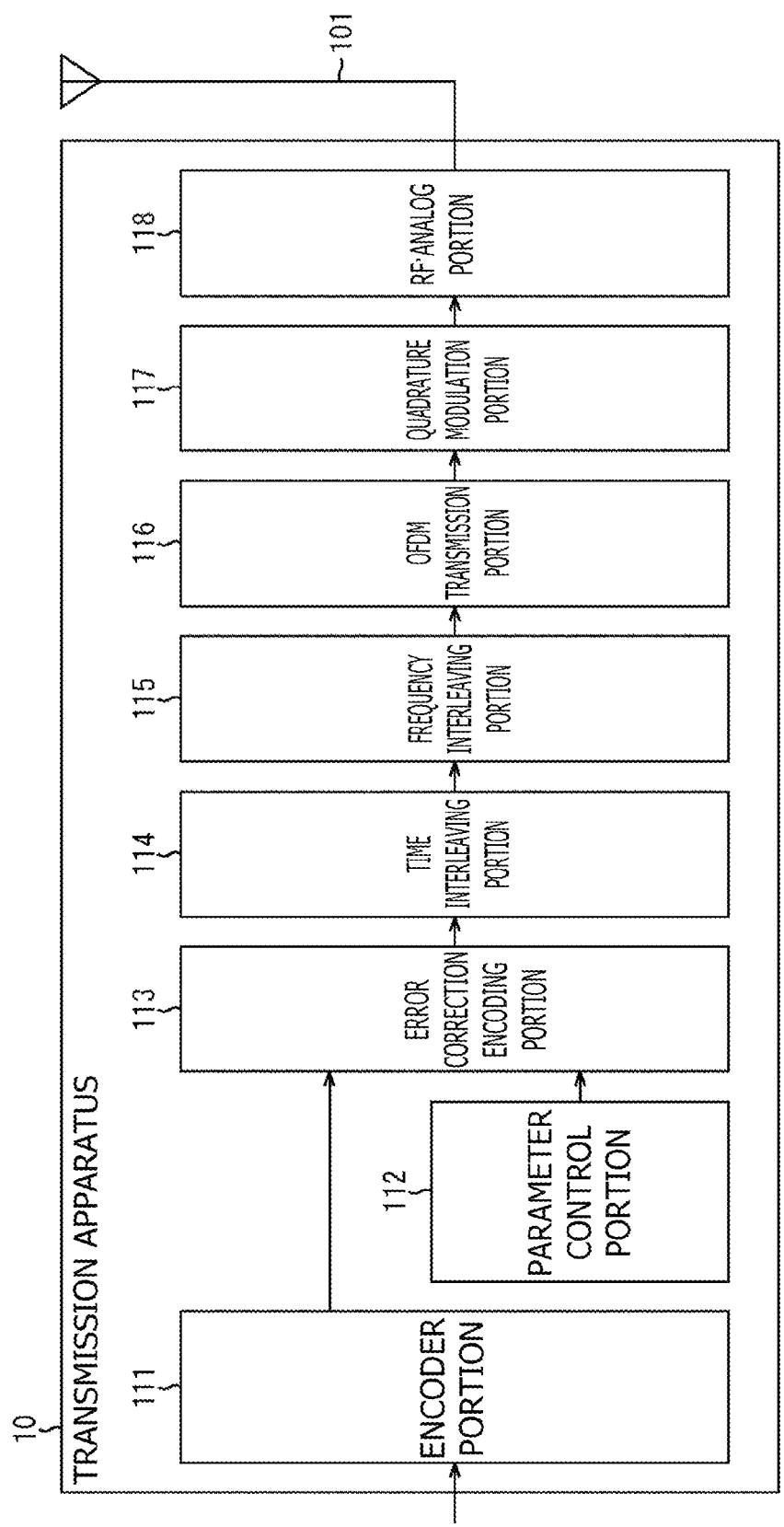

F I G . 1 6
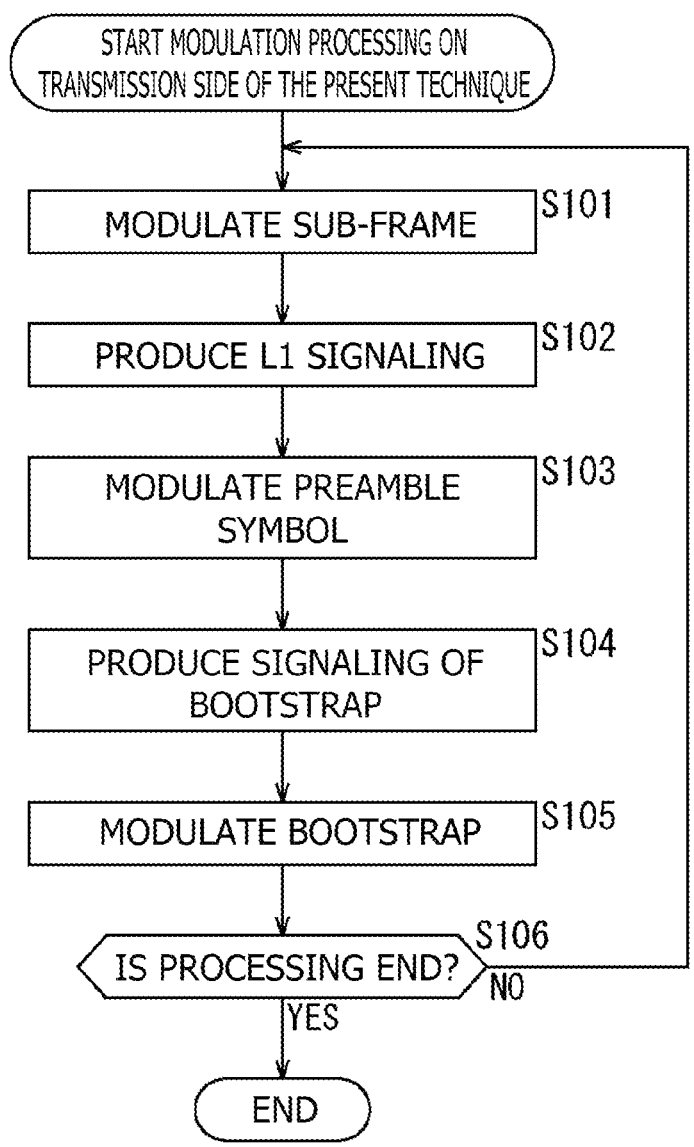

FIG.19

| L1-Basic signaling fields and syntax | | |
|---|---|---|
| Syntax | # of bits | format |
| L1_Basic_signaling() { | | |
|     L1B_content_tag | 2 | uimsbf |
|     L1B_version | 3 | uimsbf |
|     L1B_slt_flag | 1 | uimsbf |
|     L1B_time_info_flag | 1 | uimsbf |
|     L1B_First_Sub_mimo | 1 | uimsbf |
|     L1B_First_Sub_miso | 2 | uimsbf |
|     L1B_First_Sub_fft_size | 2 | uimsbf |
|     L1B_First_Sub_reduced_carriers | 3 | uimsbf |
|     L1B_First_Sub_guard_interval | 4 | uimsbf |
|     L1B_First_Sub_num_ofdm_symbols | 11 | uimsbf |
|     L1B_First_Sub_scattered_pilot_pattern | 5 | uimsbf |
|     L1B_First_Sub_scattered_pilot_boost | 3 | uimsbf |
|     L1B_First_Sub_sbs_first | 1 | uimsbf |
|     L1B_First_Sub_sbs_last | 1 | uimsbf |
|     L1B_First_Sub_sbs_null_cells | 11 | uimsbf |
|     L1B_Reserved | TBD | uimsbf |
|     L1B_crc | 32 | uimsbf |
| } | | |

FIG.20

| L1-Detail signaling fields and syntax | | |
|---|---|---|
| Syntax | # of bits | format |
| L1_Detail_signaling() { | | |
| L1D_version | 4 | uimsbf |
| for i=0 .. L1B_num_subframes { | | |
| if(i>0) { | | |
| L1D_mimo | 1 | uimsbf |
| L1D_miso | 2 | uimsbf |
| L1D_fft_size | 2 | uimsbf |
| L1D_reduced_carriers | 3 | uimsbf |
| L1D_guard_interval | 4 | uimsbf |
| L1D_num_ofdm_symbols | 11 | uimsbf |
| L1D_scattered_pilot_pattern | 5 | uimsbf |
| L1D_scattered_pilot_boost | 3 | uimsbf |
| L1D_sbs_first | 1 | uimsbf |
| L1D_sbs_last | 1 | uimsbf |
| L1D_sbs_null_cells | 11 | uimsbf |
| } | | |
| if(L1B_num_subframes>0) { | | |
| L1D_subframe_multiplex | 1 | uimsbf |
| L1D_Reserved | TBD | uimsbf |
| L1D_crc | 32 | uimsbf |
| } | | |

FIG.21

L1-Basic signaling fields and syntax

| Syntax | # of bits | format |
|---|---|---|
| L1_Basic_signaling() { | | |
|     L1B_content_tag | 2 | uimsbf |
|     L1B_version | 3 | uimsbf |
|     L1B_slt_flag | 1 | uimsbf |
|     L1B_time_info_flag | 1 | uimsbf |
|     L1B_First_Sub_mimo | 1 | uimsbf |
|     L1B_First_Sub_miso | 2 | uimsbf |
|     L1B_First_Sub_fft_size | 2 | uimsbf |
|     L1B_First_Sub_reduced_carriers | 3 | uimsbf |
|     L1B_First_Sub_guard_interval | 4 | uimsbf |
|     L1B_First_Sub_num_ofdm_symbols | 11 | uimsbf |
|     L1B_First_Sub_scattered_pilot_pattern | 5 | uimsbf |
|     L1B_First_Sub_scattered_pilot_boost | 3 | uimsbf |
|     L1B_First_Sub_sbs_first | 1 | uimsbf |
|     L1B_First_Sub_sbs_last | 1 | uimsbf |
|     L1B_First_Sub_sbs_active_carrier_start | 10 | uimsbf |
|     L1B_Reserved | TBD | uimsbf |
|     L1B_crc | 32 | uimsbf |
| } | | |

FIG.22

| L1-Detail signaling fields and syntax | | |
|---|---|---|
| Syntax | # of bits | format |
| L1_Detail_signaling() { | | |
| L1D_version | 4 | uimsbf |
| for i=0 .. L1B_num_subframes { | | |
| if (i>0) { | | |
| L1D_mimo | 1 | uimsbf |
| L1D_miso | 2 | uimsbf |
| L1D_fft_size | 2 | uimsbf |
| L1D_reduced_carriers | 3 | uimsbf |
| L1D_guard_interval | 4 | uimsbf |
| L1D_num_ofdm_symbols | 11 | uimsbf |
| L1D_scattered_pilot_pattern | 5 | uimsbf |
| L1D_scattered_pilot_boost | 3 | uimsbf |
| L1D_sbs_first | 1 | uimsbf |
| L1D_sbs_last | 1 | uimsbf |
| L1D_sbs_active_carrier_start | 10 | uimsbf |
| } | | |
| if(L1B_num_subframes>0) { | | |
| L1D_subframe_multiplex | 1 | uimsbf |
| L1D_Reserved | TBD | uimsbf |
| L1D_crc | 32 | uimsbf |
| } | | |

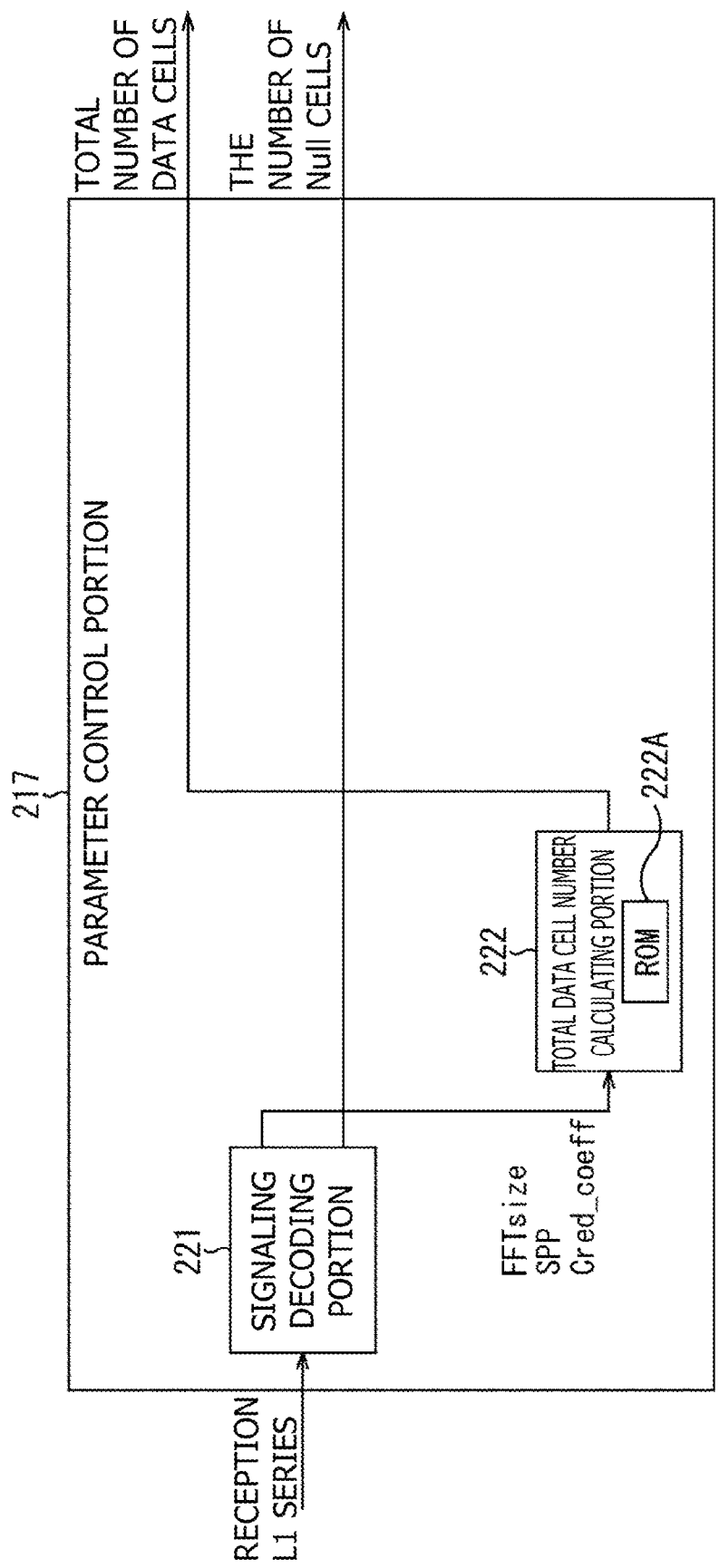

FIG.25

Set of carriers reserved for PAPR for all symbols except subframe boundary symbols of $D_X=3$ and $D_X=4$

| FFT (# of Reserved tones) | TR Carrier Indices |
|---|---|
| 8k (72) | 250, 386, 407, 550, 591, 717, 763, 787, 797, 839, 950, 1090, 1105, 1199, 1738, 1867, 1903, 1997, 2114, 2260, 2356, 2427, 2428, 2444, 2452, 2475, 2564, 2649, 2663, 2678, 2740, 2777, 2819, 2986, 3097, 3134, 3253, 3284, 3323, 3442, 3596, 3694, 3719, 3751, 3763, 3836, 4154, 4257, 4355, 4580, 4587, 4678, 4805, 5084, 5126, 5161, 5229, 5321, 5445, 5649, 5741, 5746, 5885, 5918, 6075, 6093, 6319, 6421, 6463, 6511, 6517, 6577 |
| 16k (144) | 421, 548, 589, 621, 644, 727, 770, 813, 857, 862, 1113, 1187, 1201, 1220, 1393, 1517, 1821, 1899, 1924, 2003, 2023, 2143, 2146, 2290, 2474, 2482, 2597, 2644, 2749, 2818, 2951, 3014, 3212, 3237, 3363, 3430, 3515, 3517, 3745, 3758, 4049, 4165, 4354, 4399, 4575, 4763, 4789, 4802, 4834, 4970, 5260, 5386, 5395, 5402, 5579, 5716, 5734, 5884, 5895, 6073, 6123, 6158, 6212, 6243, 6521, 6593, 6604, 6607, 6772, 6842, 6908, 6986, 7220, 7331, 7396, 7407, 7588, 7635, 7665, 7893, 7925, 7949, 8019, 8038, 8167, 8289, 8295, 8338, 8549, 8555, 8660, 8857, 8925, 9007, 9057, 9121, 9364, 9375, 9423, 9446, 9479, 9502, 9527, 9860, 9919, 9938, 10138, 10189, 10191, 10275, 10333, 10377, 10988, 11109, 11261, 11266, 11362, 11390, 11534, 11623, 11893, 11989, 12037, 12101, 12119, 12185, 12254, 12369, 12371, 12380, 12401, 12586, 12597, 12638, 12913, 12974, 13001, 13045, 13052, 13111, 13143, 13150, 13151, 13300 |
| 32K (288) | 803, 805, 811, 901, 1001, 1027, 1245, 1258, 1318, 1478, 1507, 1509, 1556, 1577, 1655, 1742, 1978, 2001, 2056, 2110, 2164, 2227, 2305, 2356, 2408, 2522, 2563, 2780, 2805, 2879, 3010, 3019, 3128, 3389, 3649, 3730, 3873, 4027, 4066, 4087, 4181, 4246, 4259, 4364, 4406, 4515, 4690, 4773, 4893, 4916, 4941, 4951, 4965, 5165, 5222, 5416, 5638, 5687, 5729, 5930, 5997, 6005, 6161, 6218, 6292, 6344, 6370, 6386, 6505, 6974, 7079, 7114, 7275, 7334, 7665, 7765, 7868, 7917, 7966, 8023, 8055, 8089, 8091, 8191, 8374, 8495, 8651, 8690, 8755, 8821, 9139, 9189, 9274, 9561, 9611, 9692, 9711, 9782, 9873, 9964, 10011, 10209, 10575, 10601, 10623, 10690, 10967, 11045, 11083, 11084, 11090, 11128, 11153, 11530, 11737, 11829, 11903, 11907, 11930, 11942, 12356, 12429, 12484, 12547, 12562, 12605, 12767, 12863, 13019, 13052, 13053, 13167, 13210, 13244, 13259, 13342, 13370, 13384, 13447, 13694, 13918, 14002, 14077, 14111, 14216, 14243, 14270, 14450, 14451, 14456, 14479, 14653, 14692, 14827, 14865, 14871, 14908, 15215, 15227, 15284, 15313, 15333, 15537, 15643, 15754, 15789, 16065, 16209, 16213, 16217, 16259, 16367, 16369, 16646, 16780, 16906, 16946, 17012, 17167, 17192, 17325, 17414, 17629, 17687, 17746, 17788, 17833, 17885, 17913, 18067, 18089, 18316, 18337, 18370, 18376, 18440, 18550, 18680, 18910, 18937, 19047, 19052, 19117, 19383, 19396, 19496, 19601, 19778, 19797, 20038, 20357, 20379, 20455, 20669, 20707, 20708, 20751, 20846, 20853, 20906, 21051, 21079, 21213, 21267, 21308, 21355, 21523, 21574, 21815, 21893, 21973, 22084, 22172, 22271, 22713, 22905, 23039, 23195, 23303, 23635, 23732, 23749, 23799, 23885, 23944, 24149, 24311, 24379, 24471, 24553, 24585, 24611, 24616, 24621, 24761, 24789, 24844, 24847, 24977, 25015, 25160, 25207, 25283, 25351, 25363, 25394, 25540, 25603, 25647, 25747, 25768, 25915, 25928, 26071, 26092, 26139, 26180, 26209, 26270, 26273, 26278, 26326, 26341, 26392, 26559, 26642, 26776, 26842 |

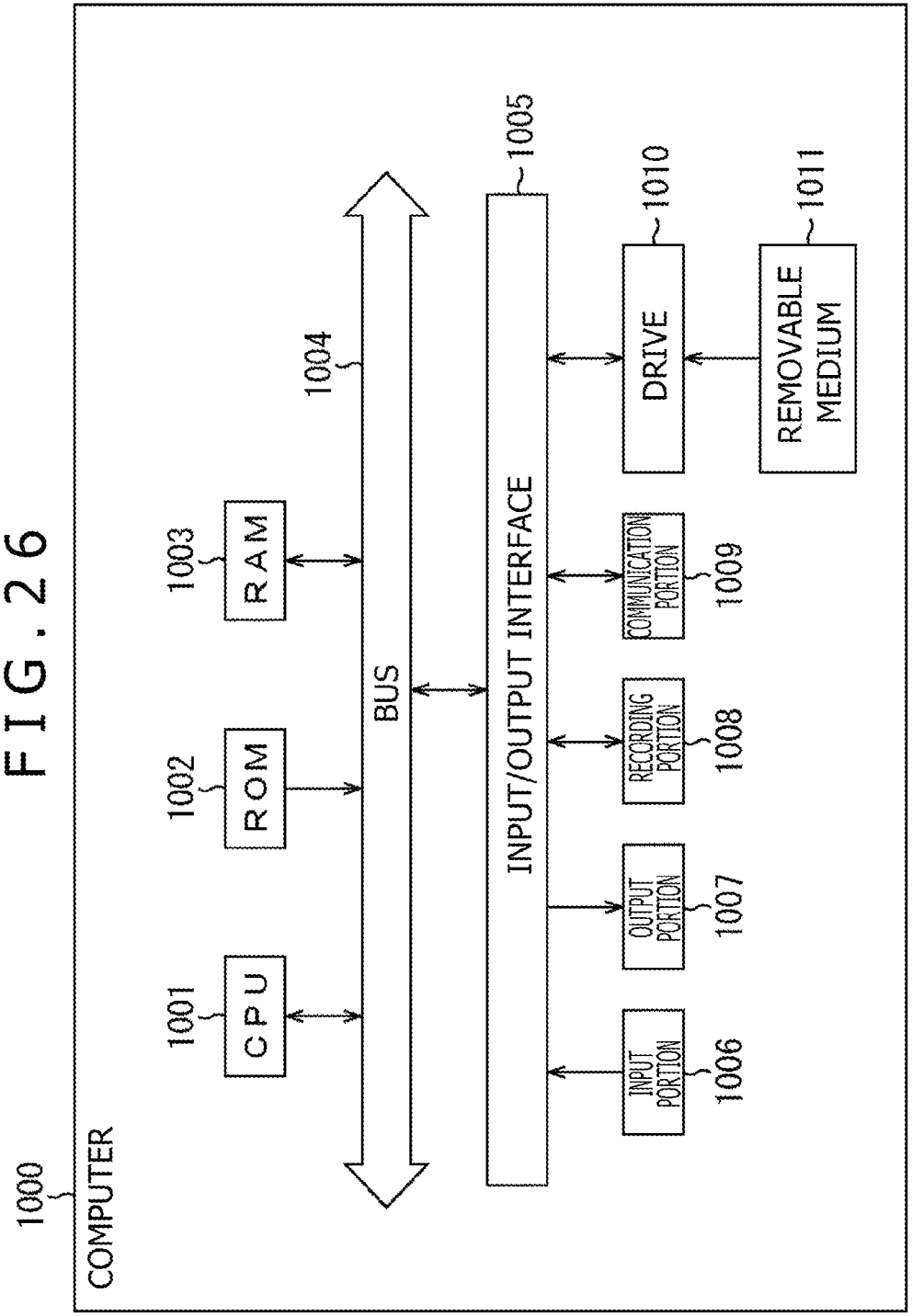

DATA PROCESSING APPARATUS AND DATA PROCESSING METHOD

RELATED APPLICATIONS

This application is a continuation of U.S. application Ser. No. 15/773,809, filed on May 4, 2018, which is a '371 National Stage of International Application No. PCT/JP2017/000924, filed on Jan. 13, 2017, which claims priority to Japanese Patent Application No. 2016-013567, filed on Jan. 27, 2016. The entire disclosures of the prior applications are hereby incorporated by reference in their entirety.

TECHNICAL FIELD

The present technique relates to a data processing apparatus and a data processing method, and more particularly to a data processing apparatus and a data processing method each of which enables a burden imposed on processing on a reception side to be reduced.

Background Art

At the present, the development of Advanced Television Systems Committee (ATSC) 3.0 as one of the next-generation terrestrial broadcasting standards is promoted (for example, refer to NPL 1).

CITATION LIST

Non Patent Literature

[NPL 1]
ATSC Candidate Standard: Physical Layer Protocol (Doc. S32-230r21 28 Sep. 2015)

SUMMARY

Technical Problem

Now, in the broadcasting standards such as ATSC3.0, signaling in a physical layer (L1 signaling) is prescribed, and a reception apparatus on a reception side shall carry out demodulation processing or the like using this L1 signaling. On the other hand, since a burden is imposed on the processing in the reception apparatus on the reception side depending on the description contents of the L1 signaling, the proposal for reducing the burden imposed on the processing on the reception side has been requested.

The present technique has been made in the light of such a situation, and enables the burden imposed on the processing on the reception side to be reduced.

Solution to Problem

A data processing apparatus of a first aspect of the present technique is a data processing apparatus provided with a production portion and a processing portion. In this case, the production portion serves to produce signaling containing a Null cell number exhibiting the number of Null cells of cells of a sub-frame included in a physical layer frame. The processing portion serves to execute processing so as for the signaling to be contained in a preamble of the physical layer frame.

The data processing apparatus of the first aspect of the present technique may be an independent apparatus or may be an internal block configuring one apparatus. In addition, a data processing method of the first aspect of the present technique is a data processing method corresponding to the data processing apparatus of the first aspect of the present technique.

In the data processing apparatus and the data processing method of the first aspect of the present technique, the signaling containing the Null cell number exhibiting the number of Null cells of cells of a sub-frame included in the physical layer frame. In addition, the signaling is processed so as to be contained in the preamble of the physical layer frame.

A data processing apparatus of a second aspect of the present technique is a data processing apparatus provided with a processing portion. The processing portion serves to process signaling contained in a preamble of a physical layer frame, and containing a Null cell number exhibiting the number of Null cells of cells of a sub-frame included in the physical layer frame.

The data processing apparatus of the second aspect of the present technique may be an independent apparatus or may be an internal block configuring one apparatus. In addition, the data processing method of the second aspect of the present technique is a data processing method corresponding to the data processing apparatus of the second aspect of the present technique.

In the data processing apparatus and the data processing method of the second aspect of the present technique, the signaling contained in the preamble of the physical layer frame, and containing the Null cell number exhibiting the number of Null cells of cells of a sub-frame included in the physical layer frame is processed.

Advantageous Effect of Invention

According to the first aspect and the second aspect of the present technique, the burden imposed on the processing on the reception side can be reduced.

It should be noted that the effect described herein is not necessarily limited, and thus any of the effects described in the present disclosure may be offered.

BRIEF DESCRIPTION OF DRAWINGS

FIG. 2 is a diagram depicting an example of syntax of L1-basic information (L1-Basic).

FIG. 3 is a diagram depicting an example of syntax of L1-detailed information (L1-Detail).

FIG. 4 is a diagram depicting an example of syntax of the L1-detailed information (L1-Detail).

FIG. 5 is a diagram depicting an example of syntax of the L1-detailed information (L1-Detail).

FIG. 7 is a diagram depicting an example of the total number of data cells.

FIG. 8 is a diagram depicting an example of the total number of data cells.

FIG. 9 is a diagram depicting the number of active data cells.

FIG. 10 is a diagram depicting the number of active data cells.

FIG. 11 is a diagram depicting the number of active data cells.

FIG. 15 is a block diagram depicting an example of a configuration of a transmission apparatus of the present technique.

FIG. 16 is a flow chart explaining a flow of modulation processing on a transmission side of the present technique.

FIG. 19 is a diagram depicting an example of syntax of L1-basic information (L1-Basic) of the present technique.

FIG. 20 is a diagram depicting an example of syntax of the L1-basic information (L1-Detail) of the present technique.

FIG. 21 is a diagram depicting another example of syntax of the L1-basic information (L1-Basic) of the present technique.

FIG. 22 is a diagram depicting still another example of syntax of the L1-basic information (L1-Detail) of the present technique.

FIG. 23 is a block diagram depicting a configuration of a parameter control portion of the present technique.

FIG. 25 is a diagram depicting an example of Tone Reservation.

FIG. 26 is a block diagram depicting an example of a configuration of a computer.

DESCRIPTION OF EMBODIMENT

Hereinafter, an embodiment of the present technique will be described with reference to the drawings. It should be noted that the description will be given in accordance with the following order.

1. Outline of Current Standards
2. Embodiment of the Present Technique
(1) Configuration of system
(2) Example of signaling
(3) Details of parameter control
3. Modified Changes
4. Configuration of Computer
<1. Outline of Current Standards>
(Structure of Physical Layer Frame)

Figure 1:
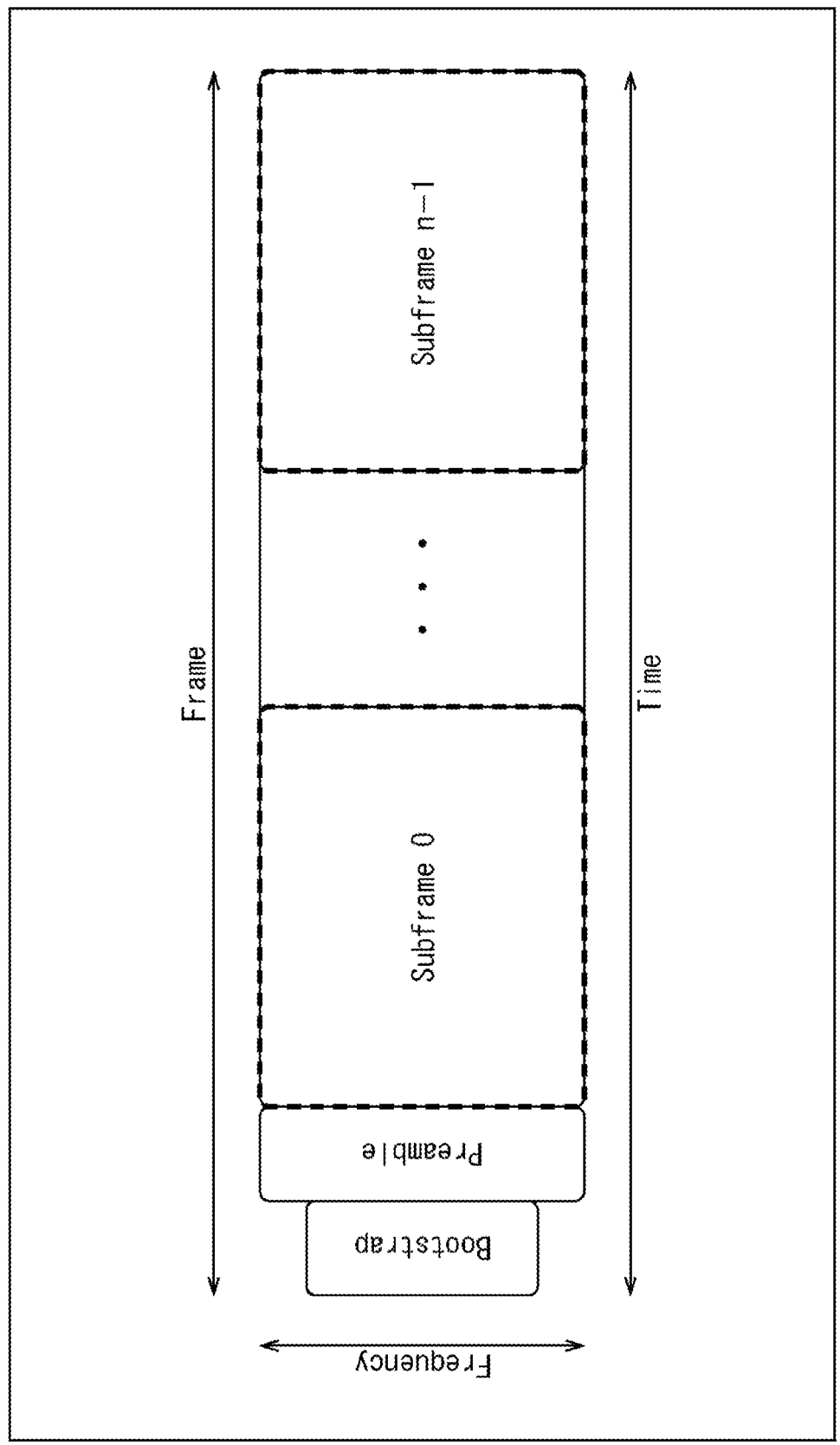
FIG. 1 is a diagram depicting a structure of a physical layer frame.

FIG. 1 is a diagram depicting a structure of a physical layer frame. In FIG. 1, a transverse direction represents Time, and a longitudinal direction represents a Frequency.

For example, the physical layer frame prescribed in ATSC3.0 includes a Bootstrap, a Preamble, and one or more Sub-frames. The physical layer frame is constituted by a predetermined frame length using a millimeter unit or the like. In the physical layer frame, after the bootstrap and the preamble are acquired, the subsequent sub-frames can be acquired.

The bootstrap, for example, corresponds to a P1 symbol constituting a T2 frame of Digital Video Broadcasting-Second Generation Terrestrial (DVB-T2). The preamble, for example, corresponds to a P2 symbol constituting the T2 frame of DVB-T2. Therefore, the bootstrap can also be said as the preamble.

L1 signaling such as L1-basic information (L1-Basic) and L1-detailed information (L1-Detail) can be contained in the preamble. Here, if the L1-basic information and the L1-detailed information are compared with each other, then, it is understood that the L1-basic information and the L1-detailed information are different in size from each other in that although the L1-basic information is constituted by bits as approximately 200 bits, the L1-detailed information is constituted by 400 bits to several thousands of bits. In addition, since in the preamble, the L1-basic information and the L1-detailed information are read out in this order, the L1-basic information is read out earlier than the L1-detailed information. Moreover, the L1-basic information and the L1-detailed information are also different from each other in that the L1-basic information is transmitted more robustly (robustness) than the L1-detailed information.

Payload (data) is arranged in the sub-frame. In the case where two or more sub-frames are included in the physical layer frame, modulation parameters such as an FFT size, a guard interval length, and a pilot pattern can be changed every sub-frame.

(Structure of L1-basic information)

FIG. 2 is a diagram depicting an example of syntax of the L1-basic information (L1-Basic) contained in the preamble of FIG. 1.

L1B_content_tag of 2 bits represents a tag value used to identify the contents. L1B_version of 3 bits represents a version of the L1-basic information. L1B_slt_flag of 1 bit represents whether or not Service Labeling Table (SLT) is present.

L1B_time_info_flag of 1 bit represents whether or not time information is present. L1B_papr of 2 bits represents an application of Peak to Average Power Reduction (PAPR).

L1B_frame_length_mode of 1 bit represents a frame mode. In the case where L1B_frame_length_mode=0, the frame mode becomes a time aligned mode. In addition, in the case where L1B_frame_length_mode=1, the frame mode becomes a symbol aligned mode.

L1B_frame_length of 10 bits represents a frame length of the physical layer frame. However, this L1B_frame_length is used only in the case where the frame mode becomes the time aligned mode, and is unused in the case where the frame mode becomes the symbol aligned mode.

L1B_num_subframes of 8 bits represents the number of sub-frames included in the physical layer frame. L1B_preamble_num_symbols of 3 bits represents the number of OFDM symbols contained in the preamble. L1B_preamble_reduced_carriers of 3 bits represents the number of control units responding to the reduction of the maximum number of carriers each having an FFT size and used in the preamble.

L1B_L1_Detail_size_bits of 16 bits represents a size of L1-detailed information (L1_Detail). L1B_L1_Detail_fec_type of 3 bits represents an FEC type of the L1-detailed information. L1B_L1_Detail _additional_parity_mode of 2 bits represents an additional parity mode of the L1-detailed information. L1B_L1_Detail_total_cells of 19 bits represents a total size of the L1-detailed information.

L1B_First_Sub_mimo of 1 bit represents a use situation of a Multiple Input and Multiple Output (MIMO) of the first sub-frame. L1B_First_Sub_miso of 1 bit represents a use situation of a Multiple Input and Single Output (MISO) of the first sub-frame.

L1B_First_Sub_fft_size of 2 bits represents the FFT size of the first sub-frame.

L1B_First_Sub_reduced_carriers of 3 bits represents the number of control units responding to the reduction of the maximum number of the carriers each having the FFT size and used in the head sub-frame.

L1B_First_Sub_guard_interval of 4 bits represents a guard interval length of the first sub-frame.

L1B_First_Sub_excess_samples of 13 bits represents the number of excessive samples inserted into a guard interval portion in the (first) sub-frame. However, this L1B_First_Sub_excess_samples is used only in the case where the frame mode becomes the time aligned mode, and is unused in the case where the frame mode becomes the symbol aligned mode.

L1B_First_Sub_num_ofdm_symbols of 11 bits represents the number of DFDM symbols contained in the first sub-frame. L1B_First_Sub_scattered_pilot_pattern of 5 bits represents a Scattered Pilot Pattern (SP pattern) used in the first sub-frame.

L1B_First_Sub_scattered_pilot_boost of 3 bits represents a value used to boost the size of the SP pattern.

Both L1B_First_Sub_sbs_first of 1 bit and L1B_First_Sub_sbs_last of 1 bit represent a Sub-frame Boundary Symbol (SBS) of the first sub-frame.

L1B_Reserved is an area (Reserved) for future extension. Although the number of bits of L1B_Reserved is undetermined (TBD: To Be Determined), the number of bits of L1B_Reserved is set as 49 bits under the present circumstances. L1B_crc of 32 bits represents that a CRC value is contained.

Incidentally, with regard to the L1-basic information (L1-Basic), "Table 9.2 L1-Basic signaling fields and syntax" of non-patent literary document 1 described above describes the detailed contents of the L1-basic information (L1-Basic). In addition, the L1-basic information (L1-Basic) means that in the case where an unsigned integer most significant bit first (unimsbf) is specified as the Format, a bit arithmetic operation is carried out so that the L1-basic information (L1-Basic) is treated as an integer number.

(Structure of L1-Detailed Information)

FIG. 3 to FIG. 5 are diagrams depicting examples of the syntax of the L1-detailed information (L1-Detail) contained in the preamble of FIG. 1.

L1D_version of 4 bits represents a version of the L1-detailed information.

A parameter regarding Channel Bonding is arranged in a loop responding to L1D_num_rf of 3 bits. Specifically, L1D_rf_frequency of 19 bits represents a frequency of RF channels bonded to each other by channel bonding.

Here, since in the case where L1B_time_info_flag=1 is obtained in the L1-basic information in FIG. 2, this exhibits that time information is present. Therefore, L1D_time_info as the time information is arranged in the L1-detailed information. It should be noted that the number of bits of L1D_time_info is to be determined (TBD).

Parameters regarding the following sub-frame are arranged in a loop responding to L1B_num_subframes of the L1-basic information of FIG. 2.

L1D_mimo of 1 bit represents a use situation of MIMO of the sub-frame. L1D_miso of 1 bit represents a use situation of MISO of the sub-frame. L1D_fft_size of 2 bits represents an FFT size of the sub-frame.

L1D_reduced_carriers of 3 bits represents the number of control units responding to the reduction of the maximum number of the carriers each having the FFT size and used in the sub-frame. L1D_guard_interval of 4 bits represents a guard interval length of the sub-frame. L1D_num_ofdm_symbols of 11 bits represents the number of DFDM symbols contained in the sub-frame.

L1D_scattered_pilot_pattern of 5 bits represents an SP pattern used in the sub-frame. L1D_scattered_pilot_boost of 3 bits represents a value used to boost a size of the SP pattern. Both L1D_sbs_first of 1 bit and L1D_sbs_last of 1 bit represent SBS of the sub-frame.

L1D_subframe_multiplex of 1 bit represents whether or not the sub-frame is adapted for time division multiplexing. L1D_frequency interleaver of 1 bit represents whether or not frequency interleave is present.

A parameter regarding PLP is arranged in a loop responding to L1D_num_plp_of 6 bits. L1D_plp_id of 6 bits, L1D_plp_slt_exist of 1 bit, L1D_plp_layer of 2 bits, L1D_plp_start of 24 bits, L1D_plp_size of 24 bits, L1D_plp_scrambler_type of 2 bits, L1D_plp_fec_type of 4 bits, and the like are arranged as the parameters.

Although the whole of the parameters regarding the PLP is not described herein, "Table 9.12 L1-Detail signaling fields and syntax" of non-patent literary document 1 described above describes the details contents of the L1-detailed information (L1-Detail).

(Outline of the Number of Null Cells)

Now, in the physical layer frame prescribed in ATSC3.0, in addition to an active data cell (cell of valid data), a Null cell is contained in each of the sub-frames. Specifically, in the case where as depicted in FIG. 6, the total number of cells within the sub-frame is set as Total Data Cells, the number of Null cells (Null Cells) is obtained by calculating following Expression (1) by using the total number of data cells and the number of active data cells (Active Data Cells).

Null Cells=Total Data Cells−Active Data Cells  (1)

Figure 6:
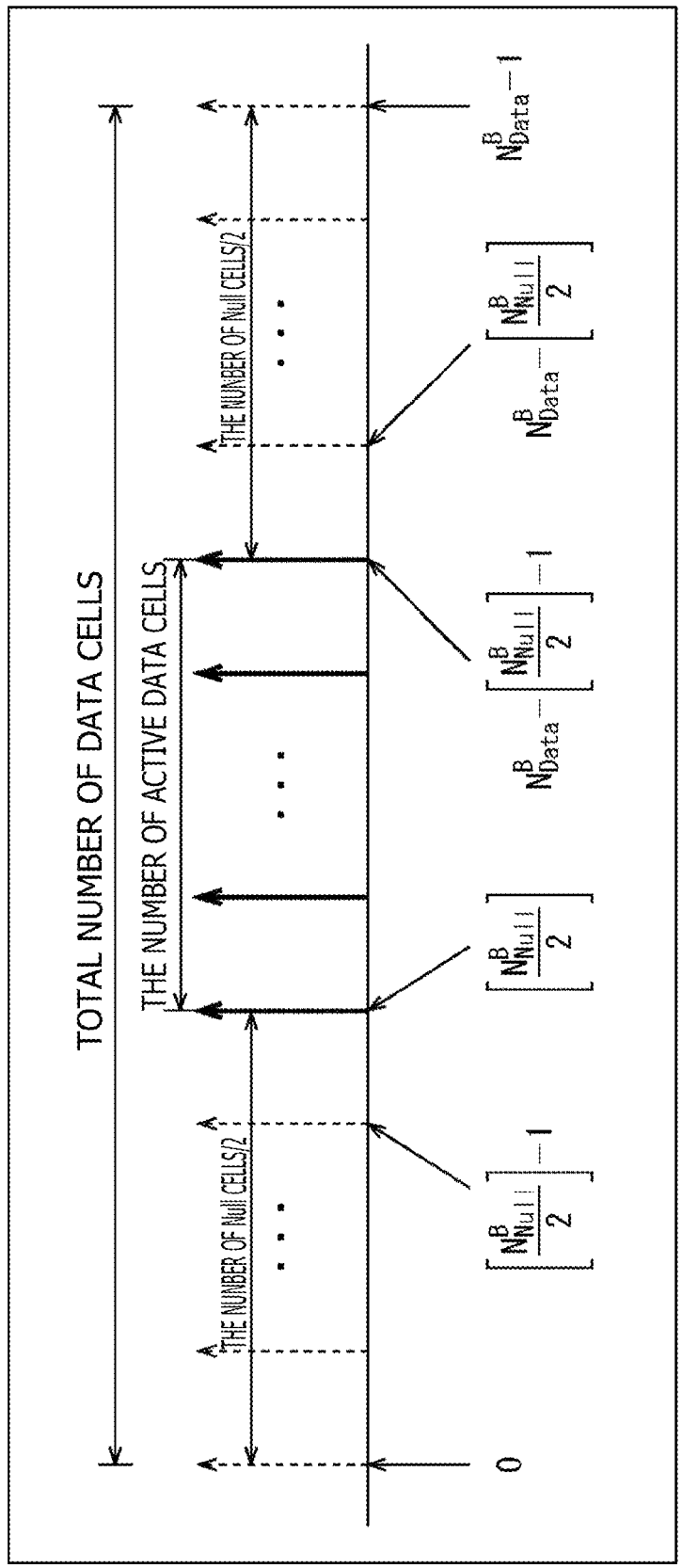
FIG. 6 is a diagram explaining an outline of a Null cell number.

It should be noted that in FIG. 6, an axis of abscissa represents a frequency, and when viewed from the whole of the total data cells, the Null cells are allocated on the ½ by ½ basis on the both sides of a center with the active data cells as the center. In addition, in FIG. 6, it is the premise that a Sub-frame Boundary Symbol (SBS) is contained in the sub-frame. However, the SBS is a symbol of the boundary of the sub-frame, and thus the first and last symbols of the sub-frame can each become the SBS in accordance with a predetermined rule.

In the case where the number of Null cells is obtained in such a manner, it is necessary to subtract the number of active data cells from the total number of data cells after the total number of data cells and the number of active data cells are each calculated.

With regard to a method of calculating the total number of data cells, a table for calculation of the total number of data cells is previously stored in a ROM (a ROM 312A (FIG. 12) which will be described later) of an apparatus (reception apparatus) on the reception side. Then, the total number of data cells is calculated by using this table and various kinds of control parameters of the L1 signaling. It should be noted that the various kinds of control parameters of the L1 signaling are obtained from the preamble of the physical layer frame.

Here, as the table used in calculating the total number of data cells, for example, there are tables depicted in FIG. 7 and FIG. 8. These tables shall be previously stored in the ROM (the ROM 312A (FIG. 12) which will be described later) of the reception apparatus. In addition, as the various kinds of control parameters of the L1 signaling used in calculating the total number of data cells, for example, there are FFT Size, Scatter and Pilot Pattern (SPP), and Cred_co-eff.

However, the various kinds of control parameters of the first sub-frame of one or more sub-frames includes in the physical layer frame are described in the L1-basic information (L1-Basic), and the various kinds of control parameters of the remaining sub-frames other than the first sub-frame are described in the L1-detailed information (L1-Detail).

Therefore, FFT Size corresponds to either L1B_First_Sub_fft_size (FIG. 2) or L1D_fft_size (FIG. 3). In addition, SPP corresponds to either L1B_First_Sub_scattered_pilot_pattern (FIG. 2) or L1D_scattered_pilot_pattern (FIG. 3). Cred_coeff corresponds to either L1B_First_Sub_reduced_carriers (FIG. 2) or L1D_reduced_carriers (FIG. 3).

In addition, with regard to a method of calculating the number of active data cells, a table for calculation of the number of active data cells is previously stored in a ROM (a ROM 313A (FIG. 12) which will be described later) of the reception apparatus on the reception side. Then, the number of active data cells is calculated by using this table and various kinds of control parameters of the L1 signaling.

Here, as the table used in calculating the number of active data cells, for example, there are tables depicted in FIG. 9 to FIG. 11. These tables shall be previously stored in the ROM (the ROM 313A (FIG. 12)) of the reception apparatus. In addition, as the various kinds of control parameters of the L1 signaling used in calculating the number of active data cells, for example, there are FFT Size, SPP, Cred_coeff, SPBoost, and PAPR.

As described above, FFT Size corresponds to either L1B_First_Sub fft size (FIG. 2) or L1D fft size (FIG. 3). In addition, SPP corresponds to either L1B_First_Sub_scattered_pilot_pattern (FIG. 2) or L1D_scattered_pilot_pattern (FIG. 3). Cred_coeff corresponds to either L1B_First_Sub_reduced_carriers (FIG. 2) or L1D_reduced_carriers (FIG. 3). In addition, SPBoost corresponds to either L1B_First_Sub_scattered_pilot_boost (FIG. 2) or L1D_scattered_pilot_boost (FIG. 3). PAPR corresponds to L1B_papr (FIG. 2).

For example, in the case where FFT Size as "16K," SPP as "SP32_4," Cred_coeff as "4," and SPBoost as "4" are deciphered as various kinds of control parameters of the L1 signaling, 12558 is calculated (frame A of FIG. 8) as the total number of data cells, and 10622 is calculated (frame B of FIG. 10) as the number of active data cells. Then, Expression (1) described above is applied to the total number of data cells and the number of active data cells which are obtained in such a manner, thereby obtaining the number of Null cells as 1966 (=12588−10622).

(Configuration of Parameter Control Portion on Current Reception Side)

Next, a description will now be given with respect to a configuration of the reception apparatus responding to the current standards. In this case, however, in order to simplify the description, the description of a quadrature demodulation portion, an OFDM reception portion, a deinterleaving portion and the like configuring the reception apparatus concerned is omitted, and the description is given with a focus on a configuration of a parameter control portion 301 (FIG. 12) for processing the L1 signaling.

Figure 12:
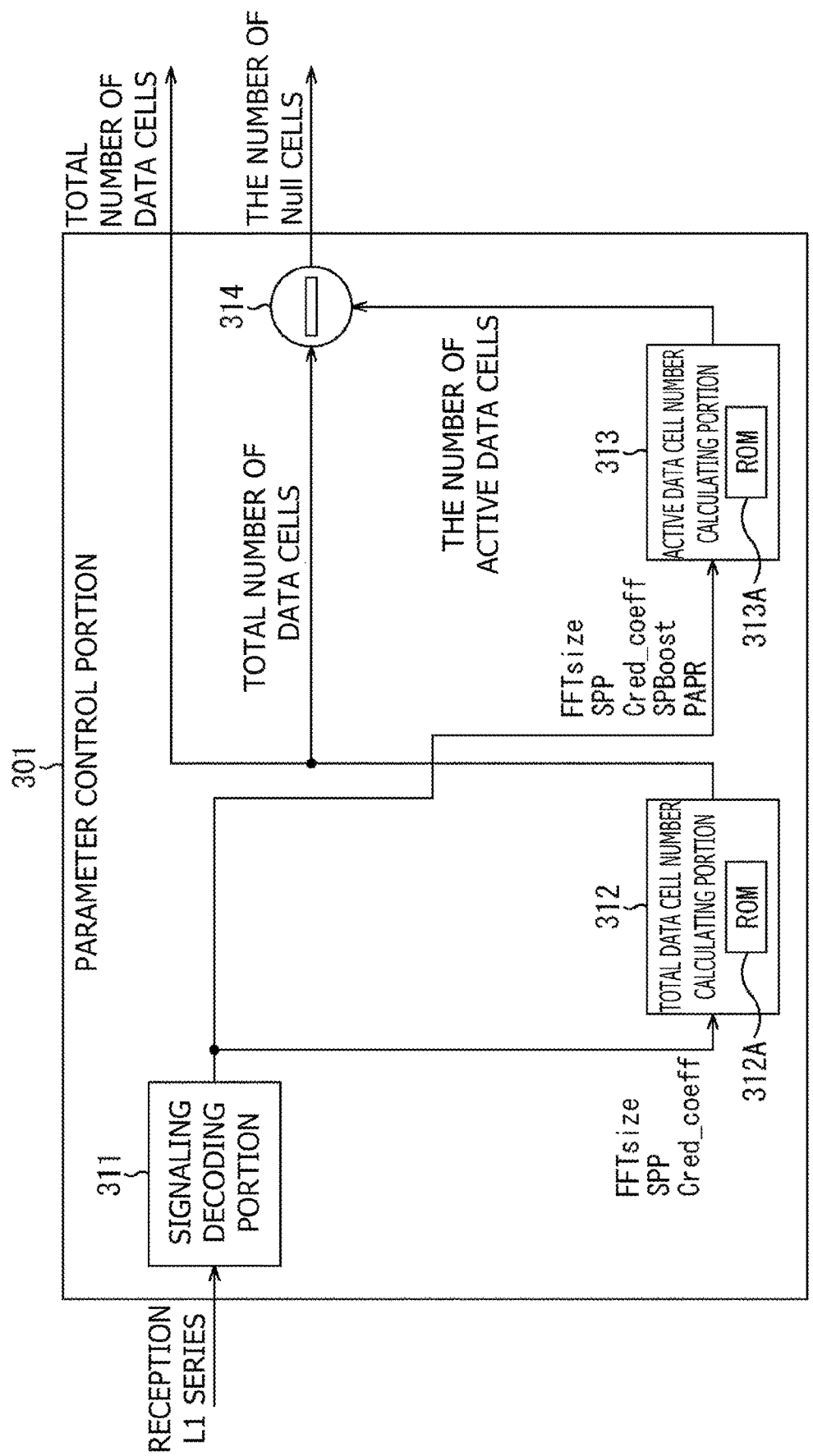
FIG. 12 is a block diagram depicting a configuration of a parameter control portion on a current reception side.

FIG. 12 is a block diagram depicting the configuration of the parameter control portion 301 on the current reception side.

In FIG. 12, the parameter control portion 301 on the current reception side is configured to include a signaling decoding portion 311, a total data cell number calculating portion 312, an active data cell number calculating portion 313, and a Null sell number calculating portion 314.

The signaling decoding portion 311 decodes data inputted thereto after error correction (reception L1 series) in accordance with a predetermined decoding system, thereby deciphering the various kinds of control parameters of the L1 signaling. The signaling decoding portion 311 supplies FFT Size, SPP, and Cred_coeff of the various kinds of control parameters thus deciphered to the total data cell number calculating portion 312, and also supplies FFT Size, SPP, Cred_coeff, SPBoost, and PAPR of the various kinds of control parameters thus deciphered to the active data cell number calculating portion 313.

The total data cell number calculating portion 312 reads out a table for calculation of the total number of data cells from the ROM 312A provided in the inside thereof, and calculates the total number of data cells responding to FFT Size, SPP, and Cred_coeff by using the table concerned. The total number of data cells is supplied to the Null cell number calculating portion 314. In addition, the total number of data cells, for example, is supplied to each of the portions of the reception apparatus, for example, the OFDM reception portion and the like utilizing the total number of data cells as the control parameter.

The active data cell number calculating portion 313 reads out a table for calculation of the number of active data cells from the ROM 313A provided in the inside thereof, and calculates the number of active data cells responding to FFT Size, SPP, Cred_coeff, SPBoost, and PAPR by using this table concerned. The number of active data cells is supplied to the Null cell number calculating portion 314.

The total number of data cells from the total data cell number calculating portion 312 and the number of active data cells from the active data cell number calculating portion 313 are both supplied to the Null cell number calculating portion 314. The Null cell number calculating portion 314 subtracts the number of active data cells from the total number of data cells by applying Expression (1) described above, thereby calculating the number of Null cells. The number of Null cells is supplied to each of the portions of the reception apparatus, for example, the frequency deinterleaving portion and the like, which utilize the number of Null cells as the control parameter.

(Flow of Current Parameter Control Processing)

Figure 13:
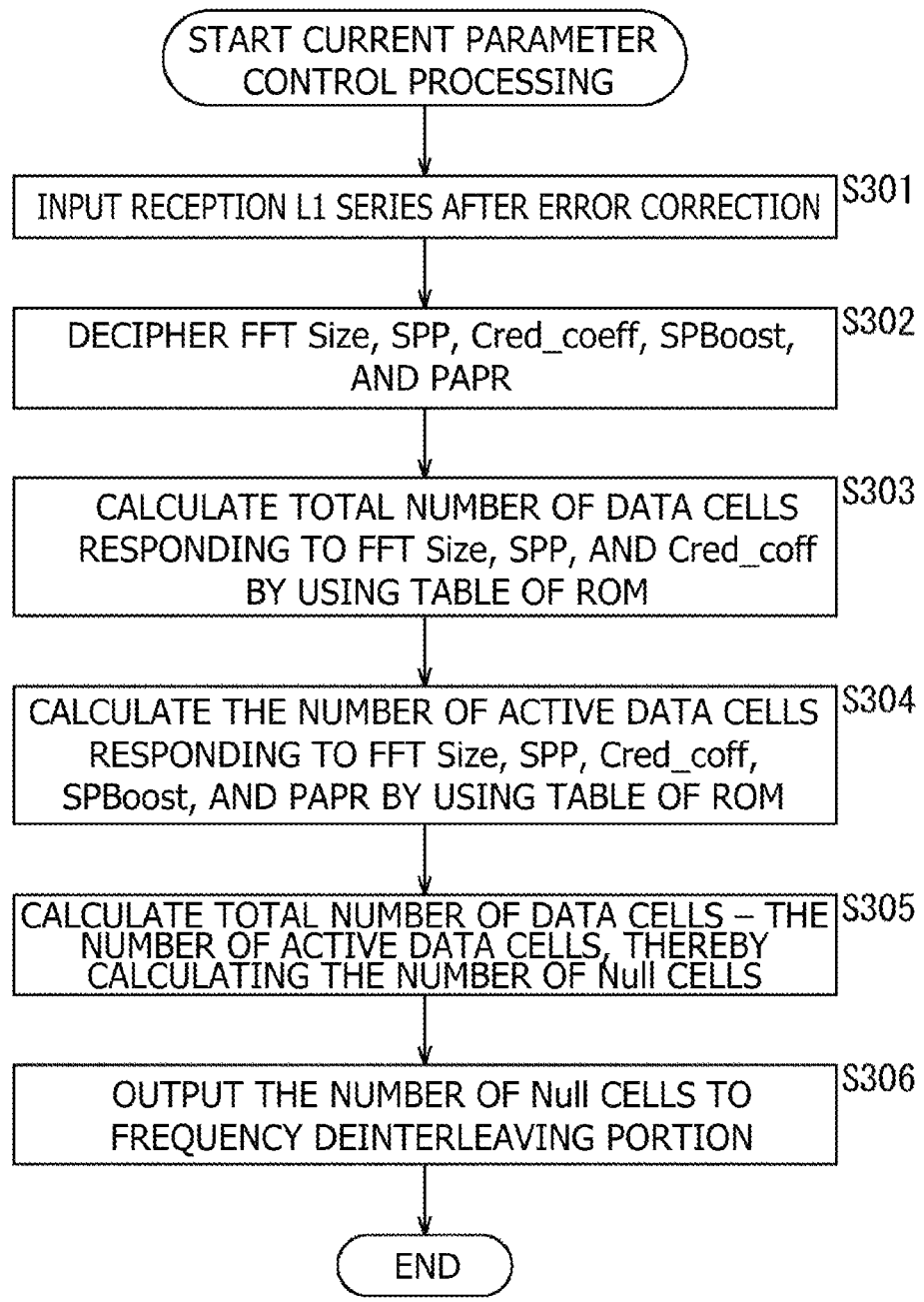
FIG. 13 is a flow chart explaining a flow of current parameter control processing.

Next, a description will now be given with respect to a flow of current parameter control processing which is executed by the parameter control portion 301 of FIG. 12 with reference to a flow chart of FIG. 13.

In Step S301, the signaling decoding portion 311 receives as an input thereof the data (reception L1 series) after the error correction. In addition, in Step S302, the signaling decoding portion 311 decodes the data (reception L1 series) after the error correction inputted thereto in the processing of Step S301 in accordance with the predetermined decoding system, thereby deciphering the various kinds of control parameters (FFT Size, SPP, Cred_coeff, SPBoost, and PAPR) of the L1 signaling.

In Step S303, the total data cell number calculating portion 312 calculates the total number of data cells responding to FFT Size, SPP, and Cred_coeff which are deciphered in the processing of Step S302 by using the table (for example, the table of FIG. 7 and FIG. 8) for calculation of the total number of data cells stored in the ROM 312A.

In Step S304, the active data cell number calculating portion 313 calculates the number of active data cells responding to FFT Size, SPP, Cred_coeff, SPBoost, and PAPR which are deciphered in the processing of Step S302 by using the table (for example, the table of FIG. 9 to FIG. 11) for calculation of the number of active data cells stored in the ROM 313A.

In Step S305, the Null cell number calculating portion 314 subtracts the number of active data cells from the total number of data cells by applying Expression (1) described above to the total number of data cells calculated in the processing of Step S303, and the number of active data cells calculated in the processing of Step S304, thereby calculating the number of Null cells.

In Step S306, the Null cell number calculating portion 314 supplies the number of Null cells calculated in the processing of Step S305 to the frequency deinterleaving portion. Then, when the processing of Step S306 is ended, the current parameter control processing of FIG. 13 is ended accordingly.

As described above, in the current parameter control processing, the total number of data cells and the number of active data cells are calculated by using the table (for example, the table of FIG. 7 and FIG. 8, the Table of FIG. 9 to FIG. 11, or the like) previously stored in the ROM, and the various kinds of control parameters (for example, FFT Size, SPP, Cred_coeff, SPBoost, and PAPR) of the deciphered L1 signaling. In addition, the number of Null cells is obtained by applying Expression (1) described above to the total number of data cells and the number of active data cells which are calculated in the manner as described above.

However, in the current reception apparatus, in order to calculate the number of Null cells by using Expression (1) described above, it was necessary to calculate the total number of data cells and the number of active data cells by using the table and the various kinds of control parameters. This calculation processing became a burden imposed on the reception apparatus. In addition, in the current reception apparatus, the multiple tables (for example, the table of FIG. 7 and FIG. 8, the table of FIG. 9 to FIG. 11, and the like) used to calculate the total number of data cells and the number of active data cells needed to be previously stored in the ROM (for example, the ROM 312A or the ROM 313A of FIG. 12, or the like). In order to attain this, a large storage capacity must be secured in the ROM, which was a burden imposed on the reception apparatus.

In such a manner, in the current standards, it was necessary to provide an arithmetic operation circuit, a memory and the like for calculating the number of Null cells. As a result, the burden imposed on the reception apparatus was increased. Then, in the present technique, the number of Null cells is not calculated in the reception apparatus on the reception side, but the number of Null cells is transmitted so as to include the L1 signaling, thereby enabling the burden imposed on the reception apparatus resulting from the number of Null cells, thereby enabling the burden imposed on the reception apparatus resulting from the number of Null cells to be reduced. Hereinafter, a description will be given with respect to a transmission system to which such a present technique is applied.

<2. Embodiment of the Present Technique>

(1) Configuration of system (Example of Configuration of Transmission System)

Figure 14:
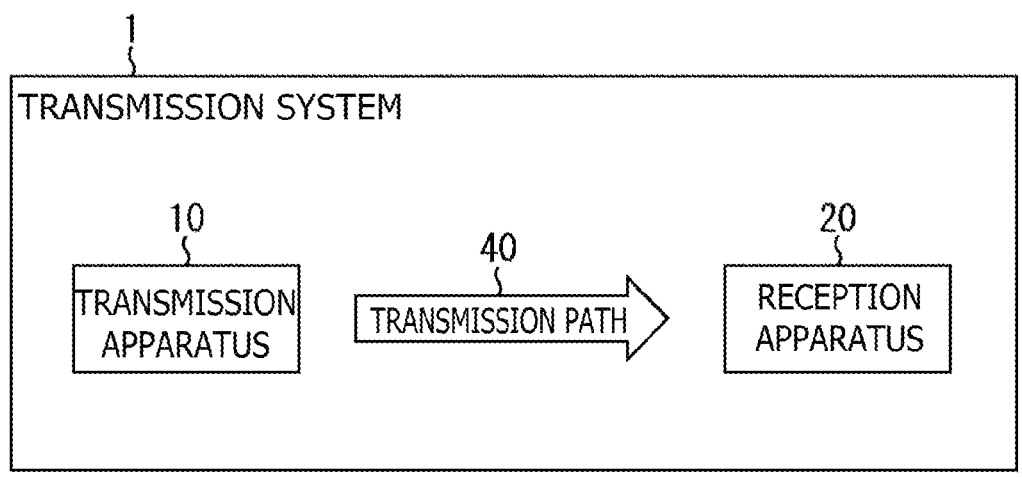
FIG. 14 is a block diagram depicting a configuration of an embodiment of a transmission system to which the present technique is applied.

FIG. 14 is a block diagram depicting a configuration of an embodiment of the transmission system to which the present technique is applied. It should be noted that the system means one in which a plurality of apparatuses is logically gathered together.

In FIG. 14, the transmission system 1 is configured to include a transmission apparatus 10 and a reception apparatus 20. In this transmission system 1, the data transmission complying with the standards of the digital broadcasting such as ATSC3.0 is carried out.

Incidentally, in ATSC3.0 as one of the next-generation terrestrial broadcasting standards, it is supposed that a system of not using a Transport Stream (ST) packet, but mainly using an Internet Protocol (IP) packet including an IP/UDP packet, that is, a User Datagram Protocol (UDP) packet is adapted in the data transmission. In addition, even in the broadcasting system other than ATSC3.0, it is expected that in the future, a system using the IP packet will be adopted.

The transmission apparatus 10 transmits contents through a transmission path 40. For example, the transmission apparatus 10 transmits a broadcasting stream containing (a component of) the video, the audio and the like constituting the contents of a broadcasting program or the like, and the signaling as a digital broadcasting signal through the transmission path 40.

The reception apparatus 20 receives the contents transmitted thereto from the transmission apparatus 10 through the transmission path 40, and outputs the contents thus received. For example, the reception apparatus 20 receives the digital broadcasting signal from the transmission apparatus 10, acquires (the component of) the video, the audio, and the like constituting the contents, and the signaling from the broadcasting stream, and reproduces the video and audio of the contents of the broadcasting program or the like.

Incidentally, although in the transmission system 1 of FIG. 14, in order to simplify the description, only one reception apparatus 20 is illustrated, a plurality of reception apparatuses 20 can be provided. In this case, the digital broadcasting signal which the transmission apparatus 10 transmits (simultaneous broadcasting) can be simultaneously received by a plurality of reception apparatuses 20 through the transmission path 40.

In addition, in the transmission system 1 of FIG. 14, a plurality of transmission apparatuses 10 can also be provided. A plurality of transmission apparatuses 10 can transmit the digital broadcasting signals containing the broadcasting stream with, for example, different frequency bands as different channels, and the reception apparatus 20 can select a channel, with which the broadcasting stream is received, from the channels of a plurality of transmission apparatuses 10.

Moreover, in the transmission system 1 of FIG. 14, the transmission path 40 may be adapted for, for example, the satellite broadcasting utilizing the Broadcasting Satellite (BS) or a Communication Satellite (CS), the cable broadcasting (CATV) using the cable, or the like in addition to the territorial broadcasting signal (territorial broadcasting).

(Example of Configuration of Transmission Apparatus)

FIG. 15 is a block diagram depicting an example of a configuration of the transmission apparatus 10 in FIG. 14.

In FIG. 15, the transmission apparatus 10 is configured to include an encoder portion 111, a parameter control portion 112, an error correction encoding portion 113, a time interleaving portion 114, a frequency interleaving portion 115, an OFDM transmitting portion 116, a quadrature modulation portion 117, and an RF.analog portion 118.

The encoder portion 111 encodes the data (of the subframe) inputted thereto from a circuit (not depicted) in a preceding stage, and supplies the encoded data to the error correction encoding portion 113.

The parameter control portion 112 produces the data of the L1 signaling (preamble) containing the various kinds of control parameters, and supplies the resulting data to the error correction encoding portion 113. For example, the L1-basic information (L1-Basic), the L1-detailed information (L1-Detail), and the like are produced as the L1 signaling. In addition, the number of Null cells (L1B First_Sub_sbs_null_cells (FIG. 19) or L1D_sbs_null_cell (FIG. 20) which will be described later) is contained as the control parameter in the L1 signaling.

The error correction analog portion 113 executes error encoding processing (for example, BCH encoding, Low Density Check (LDPC) encoding or the like) for the data supplied thereto from the encoder portion 111 and the preamble control portion 112. The error correction encoding portion 113 supplies the data after the error correction encoding to the time interleaving portion 114.

The time interleaving portion 114 carries out the interleave in the time direction for the data supplied thereto from the error correction encoding portion 113, and supplies the data after the interleave in the time direction to the frequency interleaving portion 115.

The frequency interleaving portion 115 carries out the interleave in the frequency direction for the data supplied thereto from the time interleaving portion 114, and supplies the data after the interleave in the frequency direction to the OFDM transmission portion 116.

The OFDM transmission portion 116 carries out Inverse Fast Fourier Transform (IFFT) arithmetic operation for the data supplied thereto from the frequency interleaving portion 115, and supplies the resulting Orthogonal Frequency Division Multiplexing (OFDM) signal to the quadrature modulation portion 117. It should be noted that the signaling of the bootstrap is contained in the OFDM signal.

The quadrature modulation portion 117 subjects the OFDM signal of the base band supplied thereto from the OFDM transmission portion 116 to the quadrature modulation, and supplies the resulting signal to the RF.analog portion 118. It should be noted that after Digital/Analog (D/A) conversion processing is executed for the signal processed in the quadrature modulation portion 117 to convert the digital signal into an analog signal, the resulting analog signal is inputted to the RF.analog portion 118.

The RF.analog portion 118 is connected to an antenna 101 and converts the signal supplied thereto from the quadrature modulation portion 117 into a Radio Frequency (RF) signal, and transmits the resulting RF signal to the reception apparatus 20 through the transmission path 40.

(Flow of Modulation Processing on Transmission Side of the Present Technique)

Next, a description will now be given with respect to a flow of the modulation processing, on the transmission side of the present technique, which is executed by the transmission apparatus 10 of FIG. 14. Incidentally, a description of FIG. 16 will be given with a focus on processing executed by the parameter control portion 112 and the OFDM transmission portion 116.

In Step S101, the OFDM transmission portion 116 modulates the sub-frame (sub-frame symbol).

Incidentally, although the detailed description is omitted herein, the error correction encoding processing is executed for the data obtained by the encoding in the encoder portion 111 by the error correction encoding portion 113. Thereafter, the data obtained by carrying out the interleave in the time direction and in the frequency direction by the time interleaving portion 114 and the frequency interleaving portion 115 is modulated as the sub-frame by the OFDM transmission portion 116.

In Step S102, the parameter control portion 112 produces the data associated with the L1 signaling (preamble) containing the various kinds of control parameters. For, example, the L1-basic information (L1-Basic), the L1-detailed information (L1-Detail), and the like are produced as the L1 signaling. In addition, the number of Null cells (L1B_First_Sub_sbs_null_cells (FIG. 19) or L1D_sbs_null_cells (FIG. 20) which will be described later) is contained as the control parameter in the L1 signaling.

Incidentally, although the detailed description is omitted herein, the error correction encoding processing is executed for the data associated with the L1 signaling which is produced in the processing by the error correction encoding portion 113 in Step S102. Thereafter, the interleave in the time direction and the interleave in the frequency direction are each carried out by the time interleaving portion 114 and the frequency interleaving portion 115.

In Step S103, the OFDM transmission portion 116 modulates a preamble symbol of the L1 signaling produced in the processing of Step S102.

In Step S104, the OFDM transmission portion 116 produces the signaling of the bootstrap containing the control parameters.

In Step S105, the OFDM transmission portion 116 modulates the signaling of the bootstrap produced in the processing in Step S104.

In Step S106, it is decided whether or not the processing should be ended. In the case where it is decided in Step S106 that the processing should not be ended, the processing is returned back to Step S101. Then, the pieces of processing Step S101 to Step S105 described above are repetitively executed with a next physical layer frame as the processing target.

On the other hand, in the case where it is decided in Step S106 that the processing should be ended, the modulation processing on the transmission side of the present technique of FIG. 16 is ended.

The flow of the modulation processing on the transmission side of the present technique has been described so far. In the modulation processing on the transmission side of the present technique, in addition to FFT Size, SPP, Cred_coeff, and the like, the number of Null cells is also produced as the various kinds of control parameters, and is transmitted so as to be contained in the L1 signaling (preamble).

(Example of Configuration of Reception Apparatus)

Figure 17:
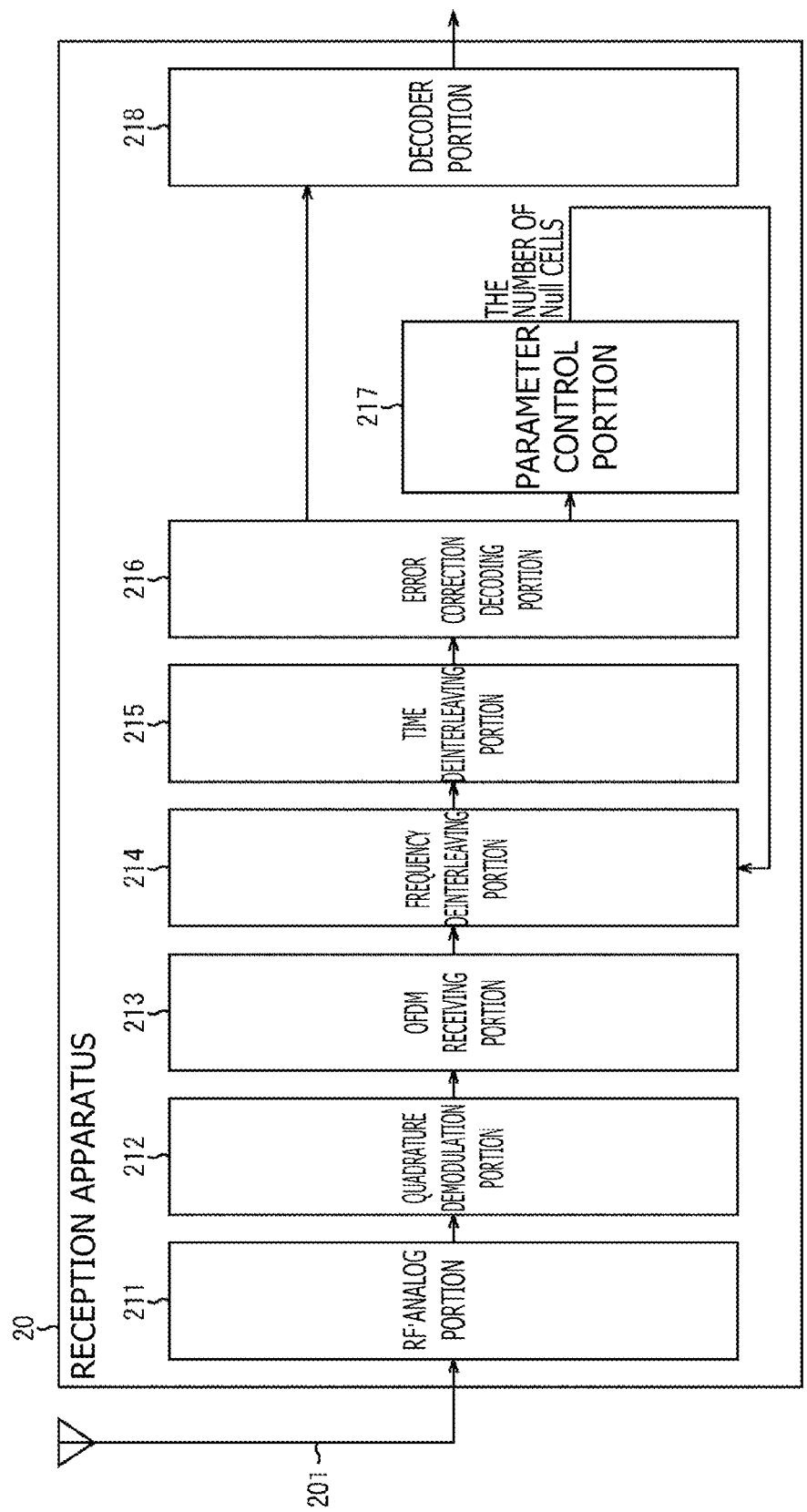
FIG. 17 is a block diagram depicting an example of a configuration of a reception apparatus of the present technique.

FIG. 17 is block diagram depicting an example of a configuration of the reception apparatus 20 of FIG. 14.

In FIG. 17, the reception apparatus 20 is configured to include an RF.analog portion 211, a quadrature demodulation portion 212, an OFDM receiving portion 213, a frequency interleaving portion 214, a time interleaving portion 215, an error correction decoding portion 216, a parameter control portion 217, and a decoder portion 218.

The RF.analog portion 211 is connected to an antenna 201, and receives the RF signal transmitted thereto from the transmission apparatus 10 through the transmission path 40. The RF.analog portion 211 processes the RF signal and supplies the resulting signal to the quadrature demodulation portion 212. Incidentally, after the signal obtained by the processing in the RF.analog portion 211 is subjected to Analog/Digital (A/D) conversion processing to be converted from the analog signal into the digital signal, the resulting digital signal is inputted to the quadrature demodulation portion 212.

The quadrature demodulation portion 212 subjects the signal supplied thereto from the RF.analog portion 211 to the quadrature demodulation, and supplies the resulting OFDM signal of the base band to the OFDM receiving portion 213.

The OFDM receiving portion 213 carries out the Fast Fourier Transform (FFT) arithmetic operation for the OFDM signal supplied thereto from the quadrature demodulation portion 212, extracts the data quadrature-demodulated to the subcarriers, and supplies the data concerned to the frequency deinterleaving portion 214.

The frequency deinterleaving portion 214 carries out the deinterleave in the frequency direction for the data supplied thereto from the OFDM receiving portion 213, and supplies the data after the deinterleave in the frequency direction to the time deinterleaving portion 215.

The time deinterleaving portion 215 carries out the deinterleave in the time direction for the data supplied thereto from the frequency demodulating portion 214, and supplies the data after the deinterleave in the time direction to the error converting decoding portion 216.

The error converting decoding portion 216 executes the error correction processing (for example, the LDPC decoding, the BCH decoding or the like) for the data supplied thereto from the time deinterleaving portion 215. The error correction decoding portion 216 supplies the data associated with the preamble of the pieces of data after the error correction to the parameter control portion 217, and supplies the data associated with the sub-frame to the decoder portion 218.

The parameter control portion 217 processes the data supplied thereto from the error correction decoding portion 216, and supplies the various kinds of control parameters contained in the L1 signaling to each of the portions of the reception apparatus 20. It should be noted that the detailed configuration of the parameter control portion 217 will be described later with reference to FIG. 23.

For example, the parameter control portion 217 supplies the number of Null cells (L1B_First_Sub_sbs_null_cells (FIG. 19) or L1D_sbs_null_cells (FIG. 20) which will be described later) which is contained in the L1 signaling to the frequency deinterleaving portion 214. As a result, the frequency deinterleaving portion 214 carries out the deinterleave in the frequency direction for the active data associated with the portion except for the Null cells in response to the number of Null cells from the parameter control portion 217.

The decoder portion 218 decodes the data (of the sub-frame) supplied thereto from the error correction decoding portion 216, and outputs the resulting data to a circuit (not depicted) in a subsequent stage.

(Flow of Decoding Processing on Reception Side of the Present Technique)

Figure 18:
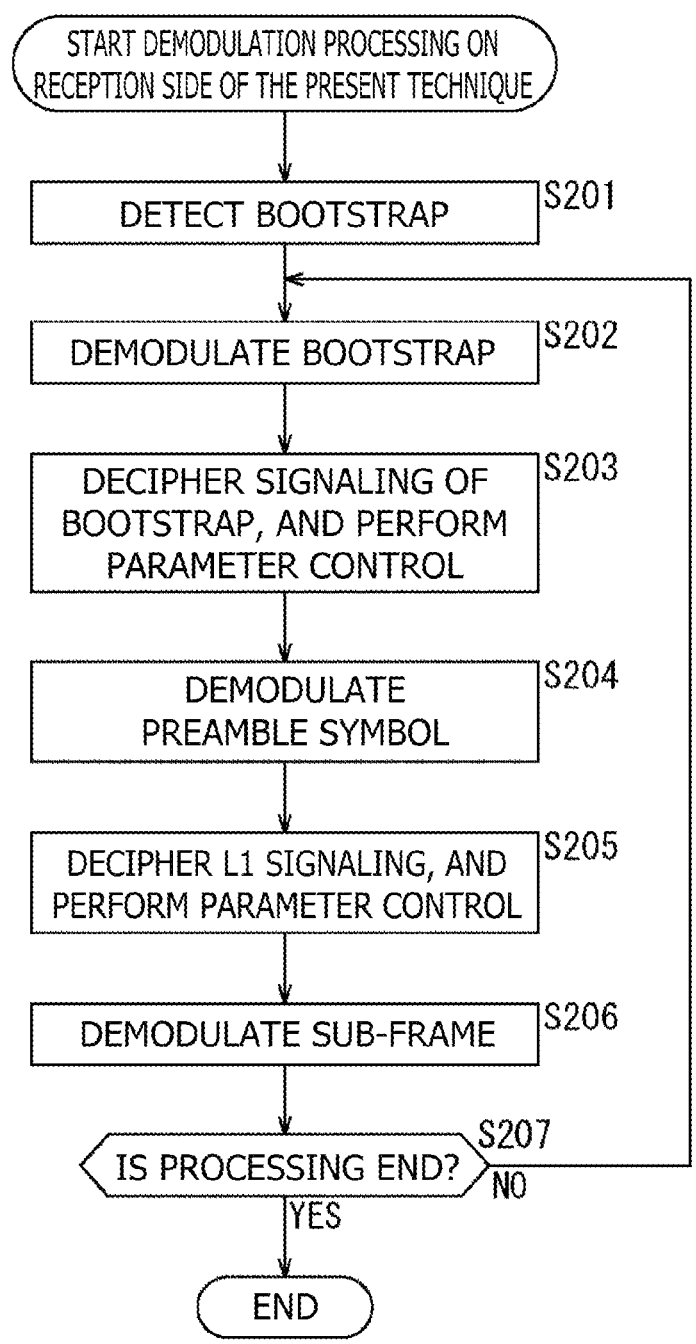
FIG. 18 is a flow chart explaining a flow of demodulation processing on a reception side of the present technique.

Next, FIG. 18 describes a flow of the decoding processing, on the reception side of the present technique, which is executed by the reception apparatus 20 of FIG. 14. However, a description of FIG. 18 will be given with a focus on the processing which is executed by the OFDM receiving portion 213, and the parameter control portion 217.

In Step S201, the OFDM receiving portion 213 detects the bootstrap of the physical layer frame. Here, in the case where the OFDM receiving portion 213 detects the bootstrap, the OFDM receiving portion 213 carries out the correlated calculation of the time domain for the OFDM signal of the base band, and detects a position where the autocorrelation becomes maximum as a trigger position of the bootstrap.

In Step S202, the OFDM receiving portion 213 executes the equalization processing for the bootstrap detected in the processing of Step S201, and demodulates the bootstrap.

In Step S203, the OFDM receiving portion 213 deciphers (decodes) the signaling of the bootstrap demodulated in the processing of Step S202, and carries out the parameter control using the resulting control parameters.

In Step S204, the OFDM receiving portion 213 executes the equalization processing for the preamble symbol in accordance with the parameter control for the processing of Step S203, and demodulates the preamble symbol.

Incidentally, although the detailed description is omitted herein, the frequency deinterleaving portion 214 and the time deinterleaving portion 215 execute the deinterleave in the frequency direction and the deinterleave in the time direction, respectively, for the preamble symbol demodulated in the processing of Step S204. Thereafter, the error correction decoding portion 216 executes the error correction decoding processing for the preamble symbol demodulated in the processing of Step S204.

In Step S205, the parameter control portion 217 deciphers (decodes) the L1 signaling contained in the preamble which is obtained in the processing or the like of Step S204, and carries out the parameter control using the various kinds of resulting control parameters.

For example, the parameter control portion 217 supplies the number of Null cells (L1B_First_Sub_abs_null_cells (FIG. 19) or L1D_sbs_null_cells (FIG. 20) which will be described later) contained in the L1 signaling to the frequency deinterleaving portion 214. As a result, the frequency deinterleaving portion 214 carries out the deinterleave in the frequency direction for the active data associated with a portion except for the number of Null cells in response to the number of Null cells from the parameter control portion 217.

In Step S206, the OFDM receiving portion 213 executes the equalization processing for the sub-frame (sub-frame symbol) in accordance with the parameter control for the processing of Step S205, and demodulates the sub-frame.

Incidentally, although the detailed description is omitted herein, the frequency deinterleaving portion 214 and the time deinterleaving portion 215 execute the deinterleave in the frequency direction and the deinterleave in the time direction, respectively, for the sub-frame which is demodulated in the processing of Step S206. Thereafter, the error correction decoding portion 216 executes the error correction decoding processing for the sub-frame demodulated in the processing of Step S206. Then, the decoder portion 218 decodes the data (of the sub-frame) obtained in the processing or the like of Step S206, and outputs the resulting data.

In Step S207, it is decided whether or not the processing should be ended. In the case where it is decided in Step S207 that the processing should not be ended, the processing is returned back to Step S202. Then, the pieces of processing Steps 5202 to 5206 described above are repetitively executed with a next physical frame as a processing target.

On the other hand, in the case where it is decided in Step S207 that the processing should be ended, the decoding processing on the reception side of the present technique of FIG. 18 is ended.

The flow of the demodulation processing on the reception side of the present technique has been described so far. In the demodulation processing in the reception side of the present technique, the number of Null cells can be acquired together with FFT Size, SPP, Cred_coeff, and the like as the various kinds of control parameters which are transmitted so as to be contained in the L1 signaling (preamble). Therefore, it is unnecessary to provide an arithmetic operation circuit, a memory, and the like for calculating the number of Null cells, and thus the burden imposed on the reception apparatus can be reduced.

(2) Example of Signaling
(Structure of L1-Basic Information)

FIG. 19 is a diagram depicting an example of syntax of L1-basic information (L1-Basic) of the present technique.

Although in FIG. 19, the description is given with a part of the L1-basic information being extracted, the L1-basic information of FIG. 19 is different from the L1-basic information of FIG. 2 in that the field of L1B_First_Sub_sbs_null_cells of 11 bits is added (thick letters in the figure). This L1B_First_Sub_sbs_null_cells represents the number of Null cells of the first sub-frame.

It should be noted that although the number of bits of L1B_First_Sub_sbs_null_cells is set as 11 bits in this case, the other number of bits may be set depending on the operation.

(Structure of L1-Detailed Information)

FIG. 20 is a diagram depicting an example of the syntax of the L1-detailed information (L1-Detail) of the present technique.

Although in FIG. 20, the description is given with a part of the L1-detailed information being extracted, the L1-detailed information of FIG. 20 is difficult from the L1-detailed information of FIG. 3 to FIG. 5 in that the field of L1D_sbs_null_cells of 11 bits is added (thick letters in the figure). This L1D_sbs_null_cells represents the number of Null cells of the remaining sub-frames other than the first sub-frame.

It should be noted that although the number of bits of L1D_sbs_null_cells is set as 11 bits in this case, the other number of bits may be set depending on the operation.

Here, with regard to a description method for the number of Null cells, other description methods other than the description methods depicted in FIG. 19 and FIG. 20 may be adopted. For example, as depicted in FIG. 6 described above, in each of the sub-frames, the Null cells are allocated to the both ends on ½-by-½ basis with the active data cell as the center. The half of the number of Null cells (number of ½) may be described in the L1 signaling by utilizing this relationship. Then, next, a description will be given with respect to the case where the half of the number of Null cells (number of ½) is described in the L1-basic information and the L1-detailed information with reference to FIG. 21 and FIG. 22.

(Another Structure of L1-Basic Information)

FIG. 21 is a diagram depicting another example of the syntax of the L1-basic information (L1-Basic) of the present technique.

Although the L1-basic information is described in FIG. 21 with a part thereof being extracted, the L1-basic information of FIG. 21 is different from the L1-basic information of FIG. 2 in that the field of L1B_First_Sub_sbs_active_carrier_start of 10 bits is added (thick letters in the figure). This L1B_First_Sub_sbs_active_carrier_start represents the half of the number of Null cells (number of ½) of the first sub-frame.

Here, the number of bits of L1B_First_Sub_sbs_active_carrier_start is 10 bits. Thus, the half of the number of Null cells is described, thereby resulting in that as compared with the case of L1B_First_Sub_sbs_null_cells of 11 bits in which the whole of the number of Null cells is described (FIG. 19), the number of bits of 1 bit can be reduced. It should be noted that although the number of bits of L1B_First_Sub_sbs_null_cells is set as 10 bits, the other number of bits may be set depending on the operation.

(Another Structure of L1-Detailed Information)

FIG. 22 is a diagram depicting another example of syntax of the L1-detailed information (L1-Detail) of the present technique.

Although the L1-detailed information is described in FIG. 22 with a part thereof being extracted, the L1-detailed information of FIG. 22 is different from the L1-detailed information of FIG. 3 to FIG. 5 in that the field of L1D-sbs_active_carrier_start of 10 bits is added (thick letters in the figure). This L1D-sbs_active_carrier_start represents the half (number of ½) of the number of Null cells of the remaining sub-frames other than the first sub-frame.

Here, the number of bits of L1D-sbs_active_carrier_start is 10 bits. Thus, the half of the number of Null cells is described, thereby resulting in that as compared with the case of L1D_sbs_null_cells (FIG. 20), the number of bits as 1 bit can be reduced. It should be noted that although the number of bits of L1D-sbs_active_carrier_start is set as 10 bits, the other number of bits may be set depending on the operation.

It should be noted that although in FIG. 19 to FIG. 22, the description has been given with respect to the case where the number of Null cells or the half (number of ½) of the number of Null cells is described in the L1 signaling, the number which should be described in the L1 signaling is by no means limited to the number of Null cells and, for example, the number of active data cells may be described.

Specifically, it is supposed that in the parameter control portions 217, in order to output (present) the total number of data cells to each of the portions (for example, the OFDM receiving portion 213 and the like) of the reception apparatus 20 (FIG. 17), the table for calculation for the total number of data cells is held. In this case, however, the table for calculation for the total number of data cells is used, thereby resulting in that the total number of data cells responding to FFT Size, SPP, Cred_coeff can be calculated.

Then, the number of active data cells is transmitted so as to be contained in the L1 signaling, thereby resulting in that if Expression (1) described above is calculated, then, the number of active data cells which is deciphered from the L1 signaling is subtracted from the total number of data cells which are calculated by using the table for calculation of the total number of data cell to enable the number of Null cells to be obtained. It should be noted that even in this case, since the parameter control portion 217 does not need to calculate the number of active data cells, and to hold the table for calculation of the number of active data cells, it is unchanged that the burden imposed on the reception apparatus can be reduced.

(3) Details of Parameter Control

Next, a description will be given with respect to the details of the parameter control portion by the parameter control portion 217 in the case where the L1-basic information (L1-Basic) of FIG. 19, and the L1-detailed information (L1-Detail) of FIG. 20 are transmitted as the L1 signaling.

(Configuration of Parameter Control Portion of the Present Technique)

FIG. 23 is a block diagram depicting a configuration of the parameter control portion 217 of FIG. 17.

In FIG. 23, the parameter control portion 217 is configured to include a signaling decoding portion 221 and a total data cell number calculating portion 222.

The signaling decoding portion 221 decodes the data (reception L1 series) after the error correction which is supplied thereto from the error correction decoding portion 216 (FIG. 17) in accordance with a predetermined decoding system, thereby deciphering the various kinds of control parameters of the L1 signaling.

The signaling decoding portion 221 outputs the number of Null cells (for example, L1B_First_Sub_sbs_null_cells of FIG. 19 or L1D_sbs_null_cells of FIG. 20) of the various kinds of deciphered control parameters to the frequency deinterleaving portion 214 (FIG. 17). Incidentally, a destination of the output of the number of Null cells as the control parameters is by no means limited to the frequency deinterleaving portion 214, but is supplied to each of the portions of the reception apparatus 20 (FIG. 17) utilizing the number of Null cells concerned.

In addition, the signaling decoding portion 221 supplies FFT Size, SPP, Cred_coeff of the various kinds of deciphered control parameters to the total data cell number calculating portion 222.

The total data cell number calculating portion 222 reads out the table for calculation of the total number of data cells from the ROM 222 provided in the inside thereof, and calculates the total number of data cells responding to FFT Size, SPP, Cred_coeff by using the table concerned. The total number of data cells is supplied to each of the portions of the reception apparatus 20 (FIG. 17), for example, the OFDM receiving portion 213 (FIG. 17) and the like, which utilize the total number of data cells as the control parameter.

It should be noted that although the illustration is omitted in FIG. 23, the various kinds of control parameters depicted by the signaling decoding portion 221 shall be supplied to each of the portions of the reception apparatus 20 (FIG. 17) which utilize the various kinds of control parameters concerned.

(Flow of Parameter Control Processing of the Present Technique)

Next, a description will be given with respect to a flow of parameter control processing which is executed by the parameter control portion 217 of FIG. 17 with reference to a flow chart of FIG. 24. However, the description of FIG. 24 will now be given with a focus on the processing regarding the number of Null cells of the various kinds of control parameters of the L1 signaling.

In Step S221, the signaling decoding portion 221 receives as an input thereof the data after the error correction (reception L1 series) from the error correction decoding portion 216 (FIG. 17).

In Step S222, the signaling decoding portion 221 decodes the data after the error correction (reception L1 series) inputted thereto in the processing of Step S221 in accordance with a predetermined decoding system, thereby deciphering the various kinds of control parameters (the number of Null cells) of the L1 signaling. As far as the number of Null cells, for example, L1B_First_Sub_sbs_null_cells of FIG. 19 or L1D_sbs_null_cells of FIG. 20 is deciphered.

In Step S223, the signaling decoding portion 221 outputs the number of Null cells deciphered in the processing of Step S222 to the frequency deinterleaving portion 214 (FIG. 17). Then, when the processing of Step S223 s ended, the parameter control processing of the present technique of FIG. 24 is ended accordingly.

Figure 24:
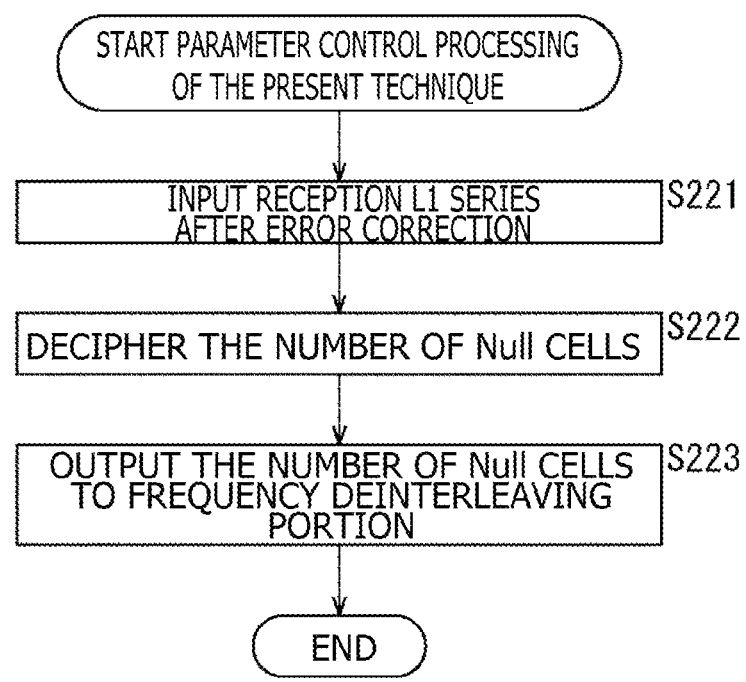
FIG. 24 is a flow chart explaining a flow of parameter control processing of the present technique.

It should be noted that although in the parameter control processing of FIG. 24, the description has been given with a focus on the processing regarding the number of Null cells of the various kinds of control parameters of the L1 signaling, other control parameters are also deciphered to be processed. For example, FFT Size, SPP, Cred_coeff are deciphered by the signaling decoding portions 221, thereby resulting in that the total data cell number calculating portion 222 calculates the total number of data cells responding to FFT Size, SPP, Cred_coeff by using the table (for example, the table of FIG. 7 and FIG. 8, or the like) for calculation of the total number of data cells of the ROM 222A, and outputs the total number of data cells.

The flow of the parameter control processing of the present technique has been described so far. Since in the parameter control processing of the present technique, the number of Null cells is transmitted so as to be contained in the L1 signaling, it is unnecessary to calculate the number of Null cells by using the total number of data cells and the number of active data cells. In addition, the number of Null cells contained in the L1 signaling is deciphered, thereby resulting in that the number of Null cells is acquired and outputted.

For this reason, for calculating the number of Null cells, it is unnecessary to calculate the total number of data cells and the number of active data cells by using the table stored in the ROM, and the various kinds of control parameters. Therefore, the burden imposed on the reception apparatus 20 by this calculation processing can be reduced. In addition, the multiple tables (for example, the tables of FIG. 9 to FIG. 11, and the like) used for calculating the number of cells such as the number of active data cells do not need to be stored in the ROM in advance. Therefore, a large storage capacity does not need to be secured in the ROM, and thus the burden imposed on the reception apparatus 20 can be reduced.

In such a way, in the present technique, the number of Null cells is transmitted so as to be contained in the L1 signaling, thereby resulting in that the arithmetic operation circuit, the memory and the like for calculation of the number of Null cells do not need to be provided. As a result, the burden imposed on the reception apparatus resulting from the number of Null cells can be reduced.

Incidentally, Tone Reservation is not taken into consideration in the table (for example, the table depicted in FIG. 7 and FIG. 8) for calculation of the total number of data cells described above, or the tables (for example, the tables depicted in FIG. 9 to FIG. 11) for calculation of the number of active data cells. If up to the tone reservation is taken into consideration, then, it is possible that the number of tables for calculation of the number of cells is further increased.

Here, the tone reservation is such that for the purpose of reducing the value of PAPR, a special signal is inserted into the carrier and, for example, is adopted in DVB-T2. FIG. 25 depicts an example of a carrier index of the tone reservation. For example, in the case where, for example, the tone reservation is taken into consideration, it is also supposed that the number of tables which is approximately twice the number of current tables is required.

<3. Modified Changes>

Although the description has been given with respect to ATSC (especially, ATSC3.0) as the system adopted in U.S.A. and the like, the present technique may also be applied to Integrated Services Digital Broadcasting (ISDB) as the system adopted in Japan and the like, Digital Video Broadcasting (DVB) as the system adopted in the countries of Europe and the like, or the like. In addition, although the above description has been given with ATSC3.0 in which the IP transmission system is adopted as an example, the present technique is by no means limited to the IP transmission system, and may also be applied to other systems, for example, MPEG-Transport Stream (TS) system or the like.

In addition, as far as the digital broadcasting, the present technique can be applied to the satellite broadcasting utilizing the broadcasting satellite (BS), the communication satellite (CS) or the like, the cable broadcasting such as the cable television (CATV) or the like in addition to the terrestrial broadcasting. Moreover, the name of (the field of)

the signaling described above is merely an example, and other name is used in some cases instead. For example, such other name as to mean "the number of Null cells" may be used in L1B_First_Sub_sbs_null_cells of FIG. 19 or L1D_sbs_null_cells of FIG. 20. However, the difference in these names is the formal difference, and the substantial contents such as (the field of) the signaling as the object are not defferent.

In addition, the present technique can also be applied to the predetermined standards (the standards other than the standards of the digital broadcasting) prescribed on the assumption that the transmission path other than the broadcasting network, that is, for example, the Internet or the communication line (communication network) such as the telephone network is utilized as the transmission path. In this case, the Internet or the communication line such as the telephone network is utilized as the transmission path 40 of the transmission system 1 (FIG. 14), and thus the transmission apparatus 10 can be made a server provided on the Internet. Then, the reception apparatus 20 is adapted to have a communication function, whereby the transmission apparatus 10 (server) execute the processing in response to a request made from the reception apparatus 20. On the other hand, the reception apparatus 20 shall process the data which is transmitted thereto from the transmission apparatus 10 (server) through the transmission path 40 (communication line).

<4. Configuration of Computer>

The series of pieces of processing described above can be executed by the hardware, or by the software. In the case where the series of pieces of processing described above are execute by the software, the program constituting that software is installed in the computer. FIG. 26 is a block diagram depicting an example of a configuration of hardware of a computer which executes the series of pieces of processing described above in accordance with a program.

In the computer 1000, a Central Processing Unit (CPU) 1001, a Read Only Memory (ROM) 1002, and a Random Access Memory (RAM) 1003 are connected to one another through a bus 1004. An iuput/output interface 1005 is further connected to the bus 1004. An input portion 1006, an output portion 1007, a recording portion 1008, a communication portion 1009, and a drive 1010 are connected to the input/output interface 1005.

The input portion 1006 is constituted by a keyboard, a mouse, a microphone, or the like. The output portion 1007 is constituted by a display, a speaker, or the like. The recording portion 1008 is constituted by a hard disc, a nonvolatile memory, or the like. The communication portion 1009 is constituted by a network interface, or the like. The drive 1010 drives a removable medium 1011 such as a magnetic disc, an optical disc, a magneto-optical disc or a semiconductor memory.

In the computer 1000 configured in the manner as described above, the CPU 1001 loads the program recorded in the ROM 1002 or the recording portion 1008 into the RAM 1003 through the input/output interface 1005 an the bus 1004, and executes the program, thereby executing the series of pieces of processing described above.

The program which is to be executed by the computer 1000 (CPU 1001), for example, can be recorded in the removable medium 1011 as package media or the like to be provided. In addition, the program can be provided through a wired or wireless transmission medium such as a local area network, the Internet, or digital satellite broadcasting.

In the computer 1000, by mounting the removable medium 1011 to the drive 1010, the program can be installed in the recording portion 1008 through the input/output interface 1005. In addition, the program can be received in the communication portion 1009 through a wired or wireless transmission medium, thereby being installed in the recording portion 1008. In addition thereto, the program can be installed in the ROM 1002 or in the recording portion 1008 in advance.

Here, it should be noted that the pieces of processing which are to be executed by the computer in accordance with the program do not need to be necessarily executed in time series along the order described as the flow chart. Specifically, the pieces of processing which are to be executed by the computer in accordance with the program include pieces of processing which are executed in parallel or individually (for example, the parallel processing or processing by an object). In addition, the program may be one which is to be executed by one computer (processor) or may be one which is dispersedly processed by a plurality of computers.

It should be noted that the embodiment of the present technique is by no means limited to the embodiment described above, and various changes can be made without departing from the subject matter of the present technique.

In addition, the present technique can adopt the following constitutions.

(1)

A data processing apparatus, including:

a production portion configured to produce signaling containing a Null cell number exhibiting the number of Null cells of cells of a sub-frame included in a physical layer frame; and a processing portion configured to process the signaling so as for the signaling to be included in a preamble of the physical layer frame.

(2)

The data processing apparatus according to (1), in which the Null cell number is the number of cells obtained by subtracting an active data cell number exhibiting the number of cells of valid data in the sub-frame from a total data cell number exhibiting the number of all cells in the sub-frame.

(3)

The data processing apparatus according to (1) or (2), in which the signaling contains first control information, and second control information read out after the first control information, and the Null cell number is contained either in the first control information or in the second control information.

(4)

The data processing apparatus according to (3), in which one or more sub-frames are included in the physical layer frame, the Null cell number of a first sub-frame is contained in the first control information, and the Null cell number of remaining sub-frames other than the first sub-frame is contained in the second control information.

(5)

The data processing apparatus according to (3) or (4), in which the first control information is smaller in data size than the second control information, and is transmitted in robuster style than the second control information.

(6)

The data processing apparatus according to (2), in which the production portion produces signaling containing a number of ½ of the active data cell number or the Null cell number instead of the Null cell number.

(7)

The data processing apparatus according to any one of (3) to (5), in which the physical layer frame is a physical layer frame prescribed in Advanced Television Systems Committee (ATSC) 3.0, the first control information is L1-basic information (L1-Basic) prescribed in ATSC3.0, the second control information is L1-detailed information (L1-Detail) prescribed in ATSC3.0, and a sub-frame Boundary Symbol (SBS) as a symbol of a boundary of the sub-frame is contained in the sub-frame.

(8)

A data processing method for a data processing apparatus, including the steps of:

producing signaling containing a Null cell number exhibiting the number of Null cells of cells of a sub-frame included in a physical layer frame by the data processing apparatus; and processing the signaling so as for the signaling to be contained in a preamble of the physical layer frame by the data processing apparatus.

(9)

A data processing apparatus, including:

a processing portion configured to process signaling contained in a preamble of a physical layer frame, and containing a Null cell number exhibiting the number of Null cells of cells of a sub-frame included in the physical layer frame.

(10)

The data processing apparatus according to (9), in which the processing portion decodes data, of series of a physical layer, contained in a received signal transmitted through a transmission path, and deciphers the Null cell number contained in the signaling.

(11)

The data processing apparatus according to (10), further including a frequency deinterleaving portion configured to carry out deinterleave in a frequency direction for valid data in response to the Null cell number deciphered by the processing portion.

(12)

The data processing apparatus according to (9), in which the Null cell number is the number of cells obtained by subtracting an active data cell number exhibiting the number of cells of valid data of the sub-frame from a total data cell number exhibiting the number of all cells of the sub-frame.

(13)

The data processing apparatus according to (9) or (12), in which the signaling contains first control information, and second control information read out after the first control information, and the Null cell number is contained either in the first control information or in the second control information.

(14)

The data processing apparatus according to (13), in which one or more sub-frames are included in the physical layer frame, the Null cell number of a first sub-frame is contained in the first control information, and the Null cell number of remaining sub-frames other than the first sub-frame is contained in the second control information.

(15)

The data processing apparatus according to (13) or (14), in which the first control information is smaller in data size than the second control information, and is transmitted in robuster style than the second control information.

(16)

The data processing apparatus according to (12), in which the signaling contains a number of ½ of the active data cell number or the Null cell number instead of the Null cell number, and the processing portion processes the signaling containing the active data cell number or a number of ½ of the Null cell number.

(17)

The data processing apparatus according to any one of (13) to (15), in which the physical layer frame is a physical layer frame prescribed in ATSC3.0, the first control information is L1-basic information (L1-Basic) prescribed in ATSC3.0, the second control information is L1-detailed information (L1-Detail) prescribed in ATSC3.0, and a Sub-frame Boundary Symbol (SBS) as a symbol of a boundary of the sub-frame is contained in the sub-frame.

(18)

A data processing method for a data processing apparatus, including the step of:

processing signaling contained in a preamble of a physical layer frame and containing a Null cell number exhibiting the number of Null cells of cells of a sub-frame included in the physical layer frame by the data processing apparatus.

REFERENCE SIGNS LIST

1 . . . Transmission system, 10 . . . Transmission apparatus, 20 . . . Reception apparatus, 40 . . . Transmission path, 111 . . . Encoder portion, 112 . . . Parameter control portion, 113 . . . Error correction encoding portion, 114 . . . Time interleaving portion, 115 . . . Frequency interleaving portion, 116 . . . OFDM transmitting portion, 117 . . . Quadrature modulation portion, 118 . . . RF.analog portion, 211 . . . RF.analog portion, 212 . . . Quadrature modulation portion, 213 . . . OFDM receiving portion, 214 . . . Frequency deinterleaving portion, 215 . . . Time deinterleaving portion, 216 . . . Error correction decoding portion, 217 . . . Parameter control portion, 218 . . . Decoder portion, 221 . . . Signaling decoding portion, 222 . . . Total data cell number calculating portion, 222A . . . ROM (ROM for total data cells), 1000 . . . Computer, 1001 . . . CPU

The invention claimed is:

1. A reception apparatus, comprising:

receive circuitry configured to receive a signal via broadcast, the signal conveying at least one physical layer frame including signaling and at least one subframe, the at least one subframe having as many as two subframe boundary symbols; and processing circuitry configured to process the received signal, wherein if at least one subframe boundary symbol of the as many as two subframe boundary symbols is present in the at least one subframe:

the at least one subframe boundary symbol includes a number of null cells and a number of active data cells arranged at frequencies between frequencies of the null cells, with at most half of the null cells being disposed at frequencies lower than those of the active data cells and a remainder of the null cells being disposed at frequencies higher than those of the active data cells, and the signaling includes a null cell number indicative of the number of null cells in the at least one subframe boundary symbol.

2. The reception apparatus according to claim 1, wherein the processing circuitry is configured to acquire the null cell number included in the signaling.

3. The reception apparatus according to claim 1, wherein the processing circuitry is configured to frequency deinterleave data in accordance with the null cell number.

4. The reception apparatus according to claim 1, wherein:
the null cell number is equal to a total data cell number less an active data cell number,
the total data cell number corresponds to a number of all data cells of the at least one subframe boundary symbol, and
the active data cell number corresponds to the number of active data cells of the at least one subframe boundary symbol.

5. The reception apparatus according to claim 1, wherein:
the signaling includes first control information, and second control information following the first control information, and
the null cell number is included in at least one of the first control information or the second control information.

6. The reception apparatus according to claim 5, wherein the first control information is smaller in data size than the second control information, and is transmitted in a more robust way than the second control information.

7. The reception apparatus according to claim 5, wherein:
the at least one physical layer frame is a physical layer frame consistent with ATSC 3.0,
the first control information is L1-basic information consistent with ATSC 3.0, and
the second control information is L1-detail information consistent with ATSC 3.0.

8. The reception apparatus according to claim 1 comprising:
a display,
wherein the processing circuitry is configured to control the display in accordance with the processed received signal.

9. A method for a reception apparatus, comprising:
receiving a signal via broadcast, the signal conveying at least one physical layer frame including signaling and at least one subframe, the at least one subframe having as many as two subframe boundary symbols; and
processing the received signal,
wherein if at least one subframe boundary symbol of the as many as two subframe boundary symbols is present in the at least one subframe:
the at least one subframe boundary symbol includes a number of null cells and a number of active data cells arranged at frequencies between frequencies of the null cells, with at most half of the null cells being disposed at frequencies lower than those of the active data cells and a remainder of the null cells being disposed at frequencies higher than those of the active data cells, and
the signaling includes a null cell number indicative of the number of null cells in the at least one subframe boundary symbol.

10. The method according to claim 9 comprising acquiring the null cell number included in the signaling.

11. The method according to claim 9 comprising frequency deinterleaving data in accordance with the null cell number.

12. The method according to claim 9, wherein:
the null cell number is equal to a total data cell number less an active data cell number,
the total data cell number corresponds to a number of all data cells of the at least one subframe boundary symbol, and
the active data cell number corresponds to the number of active data cells of the at least one subframe boundary symbol.

13. The method according to claim 9, wherein:
the signaling includes first control information, and second control information following the first control information, and
the null cell number is included in at least one of the first control information or the second control information.

14. The method according to claim 13, wherein the first control information is smaller in data size than the second control information, and is transmitted in a more robust way than the second control information.

15. The method according to claim 13, wherein:
the at least one physical layer frame is a physical layer frame consistent with ATSC 3.0,
the first control information is L1-basic information consistent with ATSC 3.0, and
the second control information is L1-detail information consistent with ATSC 3.0.

16. The method according to claim 9, wherein:
the reception apparatus comprises a display, and
the method comprises controlling the display in accordance with the processed received signal.

17. A non-transitory computer readable medium including computer executable instructions which, when executed by a processor of a reception apparatus, cause the reception apparatus to perform a method comprising:
receiving a signal via broadcast, the signal conveying at least one physical layer frame including signaling and at least one subframe, the at least one subframe having as many as two subframe boundary symbols; and
processing the received signal,
wherein if at least one subframe boundary symbol of the as many as two subframe boundary symbols is present in the at least one subframe:
the at least one subframe boundary symbol includes a number of null cells and a number of active data cells arranged at frequencies between frequencies of the null cells, with at most half of the null cells being disposed at frequencies lower than those of the active data cells and a remainder of the null cells being disposed at frequencies higher than those of the active data cells, and
the signaling includes a null cell number indicative of the number of null cells in the at least one subframe boundary symbol.

\* \* \* \* \*